(12) United States Patent
Faircloth et al.

(10) Patent No.: US 8,945,426 B2
(45) Date of Patent: Feb. 3, 2015

(54) ELECTRICALLY CONDUCTIVE POLYMER COMPOSITIONS FOR COATING APPLICATIONS

(75) Inventors: Tami Janene Faircloth, Santa Barbara, CA (US); Che-Hsiung Hsu, Wilmington, DE (US); Veevin Tsao Kuo Hsu, legal representative, Wilmington, DE (US); Daniel David Lecloux, West Chester, PA (US); Hjalti Skulason, Buellton, CA (US); Gordana Srdanov, Santa Barbara, CA (US); Charles D. Lang, Goleta, CA (US); Michel Dubeau, Santa Barbara, CA (US); Nancy L. Gin, Goletta, CA (US)

(73) Assignees: E I du Pont de Nemours and Company, Wilmington, DE (US); Dupont Displays Inc, Wilmington, DE (US)

( * ) Notice: Subject to any disclaimer, the term of this patent is extended or adjusted under 35 U.S.C. 154(b) by 631 days.

(21) Appl. No.: 13/202,204

(22) PCT Filed: Mar. 12, 2010

(86) PCT No.: PCT/US2010/027115
§ 371 (c)(1),
(2), (4) Date: Oct. 5, 2011

(87) PCT Pub. No.: WO2010/105140
PCT Pub. Date: Sep. 16, 2010

(65) Prior Publication Data
US 2012/0175596 A1    Jul. 12, 2012

Related U.S. Application Data

(60) Provisional application No. 61/159,624, filed on Mar. 12, 2009.

(51) Int. Cl.
*H01B 1/00* (2006.01)
*H01B 1/12* (2006.01)
(Continued)

(52) U.S. Cl.
CPC ............... *H01B 1/127* (2013.01); *B82Y 30/00* (2013.01); *C09D 165/00* (2013.01); *H01B 1/128* (2013.01);
(Continued)

(58) Field of Classification Search
None
See application file for complete search history.

(56) References Cited

U.S. PATENT DOCUMENTS 3,282,875 A   11/1966   James
4,358,545 A   11/1982   Ezzell et al.
(Continued)

FOREIGN PATENT DOCUMENTS

DE   4334390 A1   4/1995
EP   560721 A2   9/1993
(Continued)

OTHER PUBLICATIONS

Appleby et al., —Polymeric Perfluoro Bis-Sulfonimides As Possible Fuel Cells Electrolytes, J. Electrochem. Soc., 1993 vol. 140 pp. 109-111.
(Continued)

*Primary Examiner* — Harold Pyon
*Assistant Examiner* — Jaison Thomas

(57) ABSTRACT

The present invention relates to electrically conductive polymer compositions, and their use in electronic devices. The compositions contain a semi-aqueous dispersion of at least one electrically conductive polymer doped with at least one highly-fluorinated acid polymer, non-conductive oxide nanoparticles, at least one high-boiling organic liquid, and at least one lower-boiling organic liquid.

24 Claims, 1 Drawing Sheet

(51) Int. Cl.
*H01L 29/08* (2006.01)
*B82Y 30/00* (2011.01)
*C09D 165/00* (2006.01)
*C08K 3/22* (2006.01)
*C08K 3/36* (2006.01)
*C08L 27/12* (2006.01)
*C08L 81/10* (2006.01)

(52) U.S. Cl.
CPC ...... *C01P 2004/64* (2013.01); *C08G 2261/3221* (2013.01); *C08G 2261/3223* (2013.01); *C08G 2261/3241* (2013.01); *C08G 2261/3243* (2013.01); *C08G 2261/512* (2013.01); *C08G 2261/794* (2013.01); *C08G 2261/91* (2013.01); *C08G 2261/92* (2013.01); *C08K 3/22* (2013.01); *C08K 3/36* (2013.01); *C08L 27/12* (2013.01); *C08L 81/10* (2013.01)
USPC .............. 252/500; 252/519.33; 257/E51.025; 257/40

(56) References Cited

U.S. PATENT DOCUMENTS

| | | | |
|---|---|---|---|
| 4,433,082 A | 2/1984 | Grot | |
| 4,552,927 A | 11/1985 | Warren | |
| 4,731,408 A | 3/1988 | Jasne | |
| 4,795,543 A | 1/1989 | Stetter et al. | |
| 4,869,979 A | 9/1989 | Ohtani et al. | |
| 4,940,525 A | 7/1990 | Ezzell | |
| 4,959,430 A | 9/1990 | Jonas et al. | |
| 5,002,700 A | 3/1991 | Otagawa et al. | |
| 5,069,820 A | 12/1991 | Jen et al. | |
| 5,160,457 A | 11/1992 | Elsenbaumer | |
| 5,185,100 A | 2/1993 | Han et al. | |
| 5,247,190 A | 9/1993 | Friend et al. | |
| 5,286,413 A | 2/1994 | Hannecart et al. | |
| 5,300,575 A | 4/1994 | Jonas | |
| 5,317,169 A | 5/1994 | Nakano et al. | |
| 5,378,402 A | 1/1995 | Cross et al. | |
| 5,463,005 A | 10/1995 | Desmarteau | |
| 5,537,000 A | 7/1996 | Alivisatos et al. | |
| 5,705,888 A | 1/1998 | Staring et al. | |
| 5,798,170 A | 8/1998 | Zhang et al. | |
| 5,863,465 A | 1/1999 | Kinlen | |
| 5,917,279 A | 6/1999 | Elschner et al. | |
| 5,986,400 A | 11/1999 | Staring et al. | |
| 5,994,496 A | 11/1999 | Van Haare et al. | |
| 6,097,147 A | 8/2000 | Baldo et al. | |
| 6,150,426 A | 11/2000 | Curtin | |
| 6,210,790 B1 | 4/2001 | Crivello | |
| 6,303,238 B1 | 10/2001 | Thompson et al. | |
| 6,303,943 B1 | 10/2001 | Yu et al. | |
| 6,319,428 B1 | 11/2001 | Michot et al. | |
| 6,324,091 B1 | 11/2001 | Gryko et al. | |
| 6,337,370 B1 | 1/2002 | Bae et al. | |
| 6,358,437 B1 | 3/2002 | Jonas | |
| 6,515,314 B1 | 2/2003 | Duggal et al. | |
| 6,632,472 B2 | 10/2003 | Louwet | |
| 6,670,645 B2 | 12/2003 | Grushin et al. | |
| 6,706,963 B2 | 3/2004 | Gaudiana et al. | |
| 6,717,358 B1 | 4/2004 | Liao et al. | |
| 6,830,828 B2 | 12/2004 | Thompson et al. | |
| 6,875,523 B2 | 4/2005 | Grushin et al. | |
| 6,923,881 B2 | 8/2005 | Tateishi et al. | |
| 6,924,047 B2 | 8/2005 | Radu et al. | |
| 6,963,005 B2 | 11/2005 | Lecloux et al. | |
| 7,023,013 B2 | 4/2006 | Ricks et al. | |
| 7,087,348 B2 | 8/2006 | Holman et al. | |
| 7,112,369 B2 | 9/2006 | Wang et al. | |
| 7,166,010 B2 | 1/2007 | Lamansky et al. | |
| 7,189,771 B2 | 3/2007 | Hsu | |
| 7,211,824 B2 | 5/2007 | Lazarev | |
| 7,244,797 B2 | 7/2007 | Kurihara | |
| 7,250,461 B2 * | 7/2007 | Hsu et al. | 524/445 |
| 7,307,276 B2 | 12/2007 | Andriessen | |
| 7,317,047 B2 * | 1/2008 | Hsu | 524/165 |
| 7,338,620 B2 * | 3/2008 | Hsu et al. | 252/500 |
| 7,351,358 B2 * | 4/2008 | Hsu et al. | 252/500 |
| 7,354,532 B2 * | 4/2008 | Hsu et al. | 252/511 |
| 7,371,336 B2 * | 5/2008 | Hsu et al. | 252/301.35 |
| 7,390,438 B2 * | 6/2008 | Hsu et al. | 252/500 |
| 7,431,866 B2 | 10/2008 | Hsu et al. | |
| 7,455,793 B2 | 11/2008 | Hsu et al. | |
| 7,462,298 B2 | 12/2008 | Hsu et al. | |
| 7,569,158 B2 | 8/2009 | Waller et al. | |
| 7,593,004 B2 | 9/2009 | Spath et al. | |
| 7,727,421 B2 | 6/2010 | Hsu et al. | |
| 7,749,407 B2 | 7/2010 | Hsu et al. | |
| 7,837,901 B2 | 11/2010 | Hsu et al. | |
| 7,837,902 B2 * | 11/2010 | Hsu et al. | 252/500 |
| 8,338,512 B2 * | 12/2012 | Hsu | 524/165 |
| 8,455,865 B2 * | 6/2013 | Hsu | 257/40 |
| 2001/0019782 A1 | 9/2001 | Igarashi et al. | |
| 2001/0038937 A1 | 11/2001 | Suzuki et al. | |
| 2002/0009680 A1 | 1/2002 | Majumdar | |
| 2002/0017612 A1 | 2/2002 | Yu et al. | |
| 2002/0038999 A1 | 4/2002 | Cao | |
| 2002/0041151 A1 | 4/2002 | Park | |
| 2002/0098377 A1 | 7/2002 | Cao et al. | |
| 2002/0099119 A1 | 7/2002 | Craig | |
| 2002/0127381 A1 | 9/2002 | Will et al. | |
| 2002/0190250 A1 | 12/2002 | Grushin et al. | |
| 2002/0192476 A1 | 12/2002 | Kambe et al. | |
| 2003/0020073 A1 | 1/2003 | Long et al. | |
| 2003/0052310 A1 | 3/2003 | Michot et al. | |
| 2003/0108771 A1 | 6/2003 | Lecloux et al. | |
| 2003/0118829 A1 | 6/2003 | Hsu | |
| 2004/0009346 A1 | 1/2004 | Jang et al. | |
| 2004/0036067 A1 | 2/2004 | Andriessen | |
| 2004/0102577 A1 | 5/2004 | Hsu et al. | |
| 2004/0124504 A1 | 7/2004 | Hsu | |
| 2004/0127637 A1 | 7/2004 | Hsu et al. | |
| 2004/0149952 A1 | 8/2004 | DePenning et al. | |
| 2004/0149962 A1 | 8/2004 | Andriessen | |
| 2004/0206942 A1 | 10/2004 | Hsu | |
| 2004/0217877 A1 | 11/2004 | Kokonaski et al. | |
| 2004/0222413 A1 | 11/2004 | Hsu et al. | |
| 2004/0254297 A1 | 12/2004 | Hsu et al. | |
| 2004/0262599 A1 | 12/2004 | Bernds | |
| 2005/0070654 A1 | 3/2005 | Hsu | |
| 2005/0089679 A1 | 4/2005 | Ittel et al. | |
| 2005/0124784 A1 | 6/2005 | Sotzing | |
| 2005/0184287 A1 | 8/2005 | Herron et al. | |
| 2005/0205860 A1 | 9/2005 | Hsu et al. | |
| 2005/0208328 A1 | 9/2005 | Hsu et al. | |
| 2005/0209388 A1 | 9/2005 | Hsu et al. | |
| 2005/0209392 A1 | 9/2005 | Luo et al. | |
| 2005/0222333 A1 | 10/2005 | Hsu | |
| 2005/0224765 A1 | 10/2005 | Hsu et al. | |
| 2005/0224788 A1 | 10/2005 | Hsu et al. | |
| 2006/0033421 A1 | 2/2006 | Matsuura et al. | |
| 2006/0076050 A1 | 4/2006 | Williams et al. | |
| 2006/0076557 A1 | 4/2006 | Waller et al. | |
| 2006/0076577 A1 | 4/2006 | Boos et al. | |
| 2006/0113510 A1 | 6/2006 | Luo et al. | |
| 2006/0180810 A1 | 8/2006 | Lee et al. | |
| 2006/0274049 A1 | 12/2006 | Spath et al. | |
| 2006/0289843 A1 | 12/2006 | Hsu et al. | |
| 2006/0292362 A1 | 12/2006 | Hsu et al. | |
| 2007/0045591 A1 | 3/2007 | Hsu et al. | |
| 2007/0069184 A1 | 3/2007 | Hsu et al. | |
| 2007/0096082 A1 | 5/2007 | Gaynor et al. | |
| 2008/0128662 A1 | 6/2008 | Hsu et al. | |
| 2008/0135809 A1 | 6/2008 | Hsu | |
| 2008/0191172 A1 | 8/2008 | Hsu | |
| 2008/0213594 A1 | 9/2008 | Hsu | |
| 2008/0248314 A1 | 10/2008 | Hsu et al. | |
| 2008/0251768 A1 | 10/2008 | Hsu et al. | |
| 2008/0258605 A1 | 10/2008 | Yukinobu | |
| 2008/0283800 A1 | 11/2008 | Hsu | |
| 2008/0296536 A1 | 12/2008 | Hsu et al. | |
| 2009/0008609 A1 | 1/2009 | Yeisley et al. | |
| 2009/0114884 A1 | 5/2009 | Hsu | |

(56) References Cited

U.S. PATENT DOCUMENTS

| | | | |
|---|---|---|---|
| 2009/0154059 A1 | 6/2009 | Wessling et al. | |
| 2010/0187982 A1* | 7/2010 | Hsu et al. | 313/504 |
| 2010/0247923 A1* | 9/2010 | Hsu | 428/419 |

FOREIGN PATENT DOCUMENTS

| | | |
|---|---|---|
| EP | 440957 A2 | 3/1996 |
| EP | 488321 A1 | 10/1997 |
| EP | 817540 A2 | 1/1998 |
| EP | 593111 A1 | 6/1998 |
| EP | 1231251 A1 | 8/2002 |
| EP | 1286569 A1 | 2/2003 |
| EP | 962943 A1 | 12/2003 |
| EP | 1371709 A1 | 12/2003 |
| EP | 1408563 A2 | 4/2004 |
| EP | 1026152 B1 | 7/2006 |
| EP | 1191614 B1 | 5/2009 |
| EP | 1191612 B1 | 9/2009 |
| EP | 1726051 B1 | 12/2010 |
| FR | 2632979 A1 | 12/1989 |
| GB | 2124635 A | 2/1984 |
| JP | 62119237 A | 5/1987 |
| JP | 01038808 B | 8/1989 |
| JP | 02249221 A | 10/1990 |
| JP | 04234453 A | 8/1992 |
| JP | 09176310 A | 7/1997 |
| JP | 11353934 A | 12/1999 |
| JP | 2000505249 A | 4/2000 |
| JP | 2001270999 A | 10/2001 |
| JP | 2001325831 A | 11/2001 |
| JP | 2002500408 A | 1/2002 |
| JP | 2002082082 A | 3/2002 |
| JP | 2002246177 A | 8/2002 |
| JP | 2003217862 A | 7/2003 |
| JP | 2004502004 T | 1/2004 |
| JP | 2004082395 A | 3/2004 |
| WO | 9831716 A1 | 7/1998 |
| WO | 9934371 A1 | 7/1999 |
| WO | 9952954 A1 | 10/1999 |
| WO | 0070655 A2 | 11/2000 |
| WO | 0138219 A1 | 5/2001 |
| WO | 0141512 A1 | 6/2001 |
| WO | 0199207 A1 | 12/2001 |
| WO | 0200759 A1 | 1/2002 |
| WO | 0202714 A2 | 1/2002 |
| WO | 0215645 A1 | 2/2002 |
| WO | 02065484 A1 | 8/2002 |
| WO | 02099907 A1 | 12/2002 |
| WO | 03006515 A1 | 1/2003 |
| WO | 03006537 A1 | 1/2003 |
| WO | 03008424 A1 | 1/2003 |
| WO | 03012908 A2 | 2/2003 |
| WO | 03040257 A1 | 5/2003 |
| WO | 03046540 A1 | 6/2003 |
| WO | 03050824 A1 | 6/2003 |
| WO | 03063555 A1 | 7/2003 |
| WO | 03074601 A2 | 9/2003 |
| WO | 03091688 A2 | 11/2003 |
| WO | 2004016710 A1 | 2/2004 |
| WO | 2004020444 A1 | 3/2004 |
| WO | 2004029128 A2 | 4/2004 |
| WO | 2004029133 A1 | 4/2004 |
| WO | 2004029176 A1 | 4/2004 |
| WO | 2004094501 A2 | 11/2004 |
| WO | 2004105150 A1 | 12/2004 |
| WO | 2005003083 A1 | 1/2005 |
| WO | 2005024853 A1 | 3/2005 |
| WO | 2005052027 A1 | 6/2005 |
| WO | 2005080525 A2 | 9/2005 |
| WO | 2005090435 A1 | 9/2005 |
| WO | 2005093872 A1 | 10/2005 |
| WO | 2005121217 A1 | 12/2005 |
| WO | 2006073968 A2 | 7/2006 |
| WO | 2006078264 A2 | 7/2006 |
| WO | 2007002682 A2 | 1/2007 |
| WO | 2007002737 A2 | 1/2007 |
| WO | 2007002740 A2 | 1/2007 |
| WO | 2007092296 A2 | 8/2007 |
| WO | 2007120143 A1 | 10/2007 |
| WO | 2007145979 A2 | 12/2007 |

OTHER PUBLICATIONS

Arnautov et al., New Dopant-Solvent System for Conductive PAN Films Production, Synthetic Metals, 1997, vol. 84, No. 1-3, pp. 133-134, Elsevier Science S.A.

Baytron Coating Guide Issue Oct. 2002—Obtained From www.hcstarck-echemicals.com.

Baytron H. C. Stark GMBH (Brochure) No Date.

Baytron P VAP A1 4083 and Baytron P VP CH 8000 Product Information for Electronic Grades Designed for Use as Hole-Injection Material in OLEDS—Obtained From www.hcstarck-echemicals.com.

Baytron Product info from baytron.com; Aug. 1, 2007.

Brown et al, "Built-in field electroabsorbtion spectroscopy of plymer light-emitting diodes incorporating a doped poly (3,4-ethylene dioxythiophene) hole injection layer," Applied Physics Letters, AIP, American Institute of Physics, vol. 75, No. 12, Sep. 20, 1999, pp. 1679-1681.

Cen et al., 1,1,2,2-Tetrafluoro-2-(polyfluoroalkoxy)ethanesulfonic Acids, 1,1,2,2-Tetrafluoro-2-(perfluoroalkoxy) ethanesulfonic Acids, and 2,2'-Oxybis(1,1,2,2-tetrafluoroethanesulfonic acid), Inorganic Chemistry, 1988, vol. 27, pp. 1376-1377, American Chemical Society.

Colvin et al—Light-Emitting Diodes Made From Cadmium Selenide Nanocrystals and a Semiconducting Polymer, Nature, 1994, vol. 370 pp. 354-357.

Conductive Polymer From Wikipedia, The Free Encyclopedia.

Database CA [Online] Chemical Abstracts Service, Columbus, OH, US; Jan. 9, 1988, Iwata, Kaoru et al: "Dopants for electrically conductive polymers" XP002335513 retrieved from STN Database accession No. 1988:7040 abstract.

Database CA [Online] Chemical Abstracts Service, Columbus, Ohio, US; Takei, Masashi et al: Metal colloid solution, electric conductor ink, electric conductor coating, and undercoating film for forming electric conductor coating layer, retrieved from STN Database accession No. 2001:847689.

Database CA [Online] Chemical Abstracts Service, Columbus, Ohio, US; Wakita, Katsuya et al: "High performance odor sensors and mthod for their manufacture," retrieved from STN Database accession No. 2002:219874.

Database CA [Online] Chemical Abstracts Service, Morimoto, Takeshi et al: "Solid Electrolytic Capacitor having Electrically Conductive Plymer on Dielectric Oxide Film" Database Accession No. 1991:113460, American Chemical Society, Columbus, OH, Oct. 5, 1990.

Desmarteau, Novel Perfluorinated Ionomers and Ionenes, J. Fluorine Chem., 1995, vol. 72, pp. 203-208.

Downs C et al: "Efficient Polymerization of Aniline at Carbon Nanotube Electrodes", Advanced Materials, vol. 11, No. 12, Jan. 1, 1999, pp. 1028-1031.

Feiring et al.—Aromatic Monomers With Pendant Fluoroalkysolfonate and Sulfonimide Groups, J Fluorine Chemistry, 2000 vol. 105 pp. 129-135.

Feiring et al.—Novel Aromatic Polymers With Pendant Lithium Perfluoroalkylsulfonate or Sulfonimide Groups, Macromolecules 2000 vol. 33 pp. 9262-9271.

Fowler J D et al: "Hydrogen detection by Polyaniline nanofibers on gold and platinum electrodes", The Journal of Physical Chemistry C, vol. 113, No. 16, Sep. 4, 2001, pp. 6444-6449.

Gustafsson et al.—Flexible Light-Emitting Diodes Made From Soluble Conducting Polymers, Nature 1992 vol. 357 pp. 477-479.

Hirai et al; "Electrochemical Behaviors of Polypyrrole, Poly-3-Methyl-thiophene, and Polyaniline Deposited on Nafion-Coated Electrodes," Journal of the Electrochemical Society, vol. 135, No. 5, May 1, 1988, pp. 1132-1137, Electrochemical Society, Manchester, NH.

(56) References Cited

OTHER PUBLICATIONS

Hsu, C.-H., Novel Preparation and Properties of Conductive Polyaniline/Nation®Film, Synthetic Metals, 1991, 671-674,41-43, Elsevier Sequoia, The Netherlands.

Iijima et al.—Single-Shell Carbon Nanotubes of 1-nm Diameter, Nature, 1993 vol. 363 pp. 603-605.

Ivanov et al, The Study of Carbon Nanotubules Produced by Catalytic Method, Chem. Phys. Lett. 1994, vol. 223 pp. 329-335.

Journal et al.,—Large-Scael Production of Single-Walled Carbon Nanotubes by the Electric-Arc Technique, Nature, 1997 vol. 388 pp. 756-758.

Kim et al, Enhancement of Electrical Conductivity of Poly(3,4-ethylenedioxythiophene)/Poly(4-styrenesulfonate) by a Change of Solvents, Synthetic Metals, Elsevier Sequoia, vol. 126, No. 2/3, pp. 311-316, Feb. 2002.

Kitani et al; "Properties of Elastic Polyaniline," Sythetic Metals, vol. 84, No. 1-3, 1997, pp. 83-84, Elsevier Science S. A.

Lee et al, Poly(thieno(3,4-b)thiophene) A New Stable Low Band Gap Conducting Polymer, Macromolecules 2001 vol. 34 pp. 5746-5747.

Levi et al—Polymer and Cathode Emission Studies of Polymer-Based Light-Emitting Diodes Under Strong Electrial Pulse Excitation, Journal of Applied Physics, 2000 vol. 88 No. 5 pp. 2548-2552.

Li et al—Large-Scale Synthesis of Aligned Carbon Nanotubes, Science, 1996 vol. 274 pp. 1701-1703.

Lim et al—Degradation of Organic Light-Emitting Devices Due to Formation and Growth of Dark Spots, Materials Science and Engineering 2001, pp. 154-159.

Madler et al—Visibly Transparent and Radiopaque Inorganic Organic Composites From Flange-Made Mixed-Oxide Fillers. Journal of Nanoparticle Research, vol. 8, No. 3-4, 2005, p. 323-333.

Riedel et al., Tailored Highly Transparent Composite Hole-Injection Layer Consisting of Petot: PSS and SiO2 Nanoparticles for Efficient Polymer Light-Emitting Diodes, Advanced Materials, 2011 vol. 23 p. 740-745.

Römpp Chemistry Dictionary, 9th Edition, 1993 (Machine translation also submitted).

Schroedner et al—Organische Feldeffekttransistoren Auf Basis Halbleitender Polymere/Organic Field-Effect Transistors Based on Semiconducting Polymers. Elektrotechnik und Informationstechnik, Springer Verlag. 2003 vol. 120 No. 6, pp. 205-209 (Machine translation also submitted).

Sharpe et al—Improved Cationic Conductive Polymer, Calgon Corp, Coating Conference (Proceeding) 1981 pp. 83-87.

Simpson et al.—Advances and Applications of Inherently Conductive Polymer Technologies Based on Poly(3,4-Ethylenedioxythiophene) 2005 AIMCAL Fall Technical Conference.

Sotzing et al—Poly(thieno(3,4-b)thiophene): A p- andn-Dopable Polythiophene Exhibiting High Optical Transparency in the Semiconducting State, Macromolecules, 2002 vol. 35 pp. 7281-7286.

Thelakkat et al—Poly(Triarylamine)S-Synthesis and Application in Electroluminescent Devices and Photovoltaics, Synthetic Metals, 1999, vol. 102 pp. 1125-1128.

Thess et al., Crystalline Ropes of Metallic Carbon Nanotubes, Science, 1996 vol. 273 pp. 483-487.

Wang—Photoconductive Materials, Kirk-Othmer Encyclopedia of Chemical Technology, Fourth Edition, 1996, vol. 18 pp. 837-860.

Wu et al, Transparent, Conductive Carbon Nanotube Files, Science, 2004, vol. 305, pp. 1273-1276.

Yang S-M et al: "The photoelectrochemical properties of TiO2 electrodes modified by quantum sized PbS and thiols", Synthetic Metals, vol. 123, No. 2, Sep. 4, 2001, pp. 267-272.

Yuan Y F et al: "Size and morphology effects of ZnO anode nanomaterials for Zn/Ni secondary batteries; Size and morphology effects of ZnO anode nanomaterials for Zn/Ni secondary batteries", Nanotechnology, vol. 16, No. 6, Jun. 1, 2005, pp. 803-808.

EESR Jun. 21, 2011; Extended European Search Report for Application No. EP 06 774 171; Udo Beierlein Examiner; Jun. 21, 2011.

ISR Aug. 2, 2005; PCT International Search Report for International Application No. PCT/US2005/012460; C. Meiners Authorized Officer; Apr. 12, 2005.

ISR Feb. 6, 2008; PCT International Search Report for International Application No. PCT/US06/25129; Elizabeth Robinson Authorized Officer Feb. 6, 2008.

ISR Oct. 31, 2008PCT International Search Report for International Application No. PCT/US08/070718; Benedikt Schlicke Authorized Officer Oct. 31, 2008.

ISR Jan. 7, 2009; PCT International Search Report for International Application No. PCT/US2009/037461; Christian Meiners Authorized Officer Jan. 7, 2009.

ISR Apr. 9, 2009; PCT International Search Report for International Application No. PCT/US09/35079; Lee W. Young Authorized Officer Apr. 9, 2009.

ISR Oct. 21, 2010; PCT International Search Report for International Application No. PCT/US2010/027115; Ki Wan Jang Authorized Officer; Oct. 21, 2010.

ISR Dec. 17, 2010; PCT International Search Report for International Application No. PCT/US2010/031836; Rahn Kim Authorized Officer Dec. 17, 2010.

ISR Dec. 20, 2010; PCT International Search Report for International Application No. PCT/US2010/032175; Kim Rahn Authorized Officer Dec. 20, 2010.

\* cited by examiner

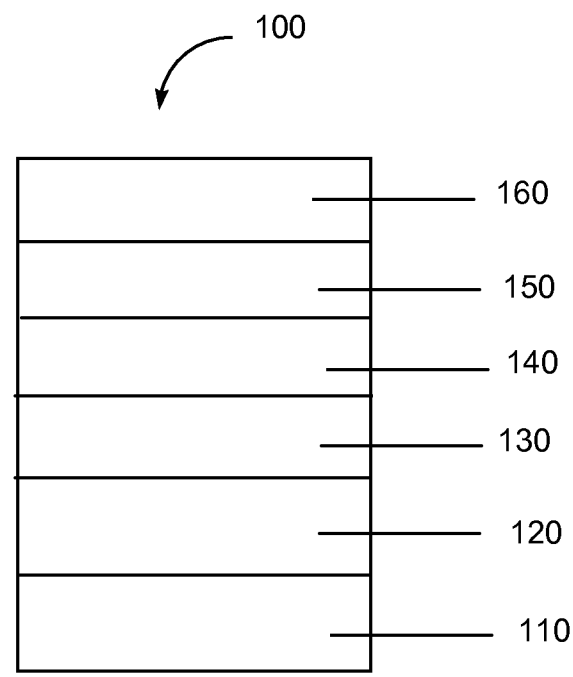

ELECTRICALLY CONDUCTIVE POLYMER COMPOSITIONS FOR COATING APPLICATIONS

RELATED APPLICATION

This application claims priority under 35 U.S.C. §119(e) from Provisional Application No. 61/159,624 filed Mar. 12, 2009 which is incorporated by reference in its entirety.

BACKGROUND INFORMATION

1. Field of the Disclosure

This disclosure relates in general to semi-aqueous electrically conductive polymer compositions for coating applications. It also relates to electronic devices including layers made from the compositions.

2. Description of the Related Art

Electronic devices define a category of products that include an active layer. Organic electronic devices have at least one organic active layer. Such devices convert electrical energy into radiation such as light emitting diodes, detect signals through electronic processes, convert radiation into electrical energy, such as photovoltaic cells, or include one or more organic semiconductor layers.

Organic light-emitting diodes (OLEDs) are an organic electronic device comprising an organic layer capable of electroluminescence. OLEDs containing conducting polymers can have the following configuration:

anode/hole-injection layer/EL material/cathode with additional layers between the electrodes. The anode is typically any material that has the ability to inject holes into the EL material, such as, for example, indium/tin oxide (ITO). The anode is optionally supported on a glass or plastic substrate. EL materials include fluorescent compounds, fluorescent and phosphorescent metal complexes, conjugated polymers, and mixtures thereof. The cathode is typically any material (such as, e.g., Ca or Ba) that has the ability to inject electrons into the EL material. Electrically conducting polymers having low conductivity in the range of $10^{-2}$ to $10^{-7}$ S/cm are commonly used as the hole-injection layer in direct contact with an electrically conductive, inorganic oxide anode such as ITO.

There is a continuing need for improved hole-injection layer materials.

SUMMARY

There is provided a composition comprising water having dispersed therein:

(a) at least one electrically conductive polymer doped with at least one highly-fluorinated acid polymer,
(b) non-conductive oxide nanoparticles;
(c) at least one high-boiling organic liquid; and
(d) at least one lower-boiling organic liquid.

In another embodiment, there is provided a film formed from the above composition.

In another embodiment, electronic devices comprising at least one layer comprising the above film are provided.

BRIEF DESCRIPTION OF THE DRAWINGS

The invention is illustrated by way of example and not limitation in the accompanying figures.

FIG. 1 is a schematic diagram of an organic electronic device.

Skilled artisans will appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

Many aspects and embodiments are described herein and are merely exemplary and not limiting. After reading this specification, skilled artisans will appreciate that other aspects and embodiments are possible without departing from the scope of the invention.

Other features and benefits of any one or more of the embodiments will be apparent from the following detailed description, and from the claims. The detailed description first addresses Definitions and Clarification of Terms followed by the Doped Electrically Conductive Polymer, the Nonconductive Oxide Nanoparticles, the High-Boiling Organic Liquid, the Lower-Boiling Organic Liquid, Preparation of the Electrically Conductive Polymer Composition, Hole-injection Layers, Electronic Devices, and finally, Examples.

1. Definitions and Clarification of Terms Used in the Specification and Claims Before addressing details of embodiments described below, some terms are defined or clarified.

The term "conductor" and its variants are intended to refer to a layer material, member, or structure having an electrical property such that current flows through such layer material, member, or structure without a substantial drop in potential. The term is intended to include semiconductors. In some embodiments, a conductor will form a layer having a conductivity of at least $10^{-7}$ S/cm.

The term "electrically conductive" as it refers to a material, is intended to mean a material which is inherently or intrinsically capable of electrical conductivity without the addition of carbon black or conductive metal particles.

The term "polymer" is intended to mean a material having at least one repeating monomeric unit. The term includes homopolymers having only one kind, or species, of monomeric unit, and copolymers having two or more different monomeric units, including copolymers formed from monomeric units of different species.

The term "acid polymer" refers to a polymer having acidic groups.

The term "acidic group" refers to a group capable of ionizing to donate a hydrogen ion to a Brønsted base.

The term "highly-fluorinated" refers to a compound in which at least 70% of the available hydrogens bonded to carbon have been replaced by fluorine.

The terms "fully-fluorinated" and "perfluorinated" are used interchangeably and refer to a compound where all of the available hydrogens bonded to carbon have been replaced by fluorine.

The composition may comprise one or more different electrically conductive polymers and one or more different highly-fluorinated acid polymers.

The term "doped" as it refers to an electrically conductive polymer, is intended to mean that the electrically conductive polymer has a polymeric counterion to balance the charge on the conductive polymer.

The term "doped conductive polymer" is intended to mean the conductive polymer and the polymeric counterion that is associated with it.

The term "layer" is used interchangeably with the term "film" and refers to a coating covering a desired area. The term is not limited by size. The area can be as large as an entire device or as small as a specific functional area such as the actual visual display, or as small as a single sub-pixel. Layers and films can be formed by any conventional deposition technique, including vapor deposition, liquid deposition (continuous and discontinuous techniques), and thermal transfer.

The term "nanoparticle" refers to a material having a particle size no greater than 50 nm. The particle size is determined as the size at cumulative 50% volume distribution.

The term "aqueous" refers to a liquid that has a significant portion of water, and in one embodiment it is at least about 40% by weight water; in some embodiments, at least about 60% by weight water.

The term "hole transport" when referring to a layer, material, member, or structure, is intended to mean such layer, material, member, or structure facilitates migration of positive charges through the thickness of such layer, material, member, or structure with relative efficiency and small loss of charge.

The term "electron transport" means when referring to a layer, material, member or structure, such a layer, material, member or structure that promotes or facilitates migration of negative charges through such a layer, material, member or structure into another layer, material, member or structure.

The term "organic electronic device" is intended to mean a device including one or more semiconductor layers or materials. Organic electronic devices include, but are not limited to: (1) devices that convert electrical energy into radiation (e.g., a light-emitting diode, light emitting diode display, diode laser, or lighting panel), (2) devices that detect signals through electronic processes (e.g., photodetectors photoconductive cells, photoresistors, photoswitches, phototransistors, phototubes, infrared ("IR") detectors, or biosensors), (3) devices that convert radiation into electrical energy (e.g., a photovoltaic device or solar cell), and (4) devices that include one or more electronic components that include one or more organic semiconductor layers (e.g., a transistor or diode).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Group numbers corresponding to columns within the Periodic Table of the elements use the "New Notation" convention as seen in the *CRC Handbook of Chemistry and Physics*, 81$^{st}$ Edition (2000-2001).

Unless otherwise defined, all technical and scientific terms used herein have the same meaning as commonly understood by one of ordinary skill in the art to which this invention belongs. In the Formulae, the letters Q, R, T, W, X, Y, and Z are used to designate atoms or groups which are defined within. All other letters are used to designate conventional atomic symbols. Group numbers corresponding to columns within the Periodic Table of the elements use the "New Notation" convention as seen in the *CRC Handbook of Chemistry and Physics*, 81$^{st}$ Edition (2000).

To the extent not described herein, many details regarding specific materials, processing acts, and circuits are conventional and may be found in textbooks and other sources within the organic light-emitting diode display, lighting source, photodetector, photovoltaic, and semiconductive member arts.

2. Doped Electrically Conductive Polymer

The composition may comprise one or more different electrically conductive polymers doped with one or more different highly-fluorinated acid polymers.

a. Electrically Conductive Polymer

Any electrically conductive polymer can be used in the new composition. In some embodiments, the electrically conductive polymer will form a film which has a conductivity greater than $10^{-7}$ S/cm.

The conductive polymers suitable for the new composition are made from at least one monomer which, when polymerized alone, forms an electrically conductive homopolymer. Such monomers are referred to herein as "conductive precursor monomers." Monomers which, when polymerized alone form homopolymers which are not electrically conductive, are referred to as "non-conductive precursor monomers." The conductive polymer can be a homopolymer or a copolymer. Conductive copolymers suitable for the new composition can be made from two or more conductive precursor monomers or from a combination of one or more conductive precursor monomers and one or more non-conductive precursor monomers.

In some embodiments, the conductive polymer is made from at least one conductive precursor monomer selected from thiophenes, pyrroles, anilines, and polycyclic aromatics. The term "polycyclic aromatic" refers to compounds having more than one aromatic ring. The rings may be joined by one or more bonds, or they may be fused together. The term "aromatic ring" is intended to include heteroaromatic rings. A "polycyclic heteroaromatic" compound has at least one heteroaromatic ring.

In some embodiments, the conductive polymer is made from at least one precursor monomer selected from thiophenes, selenophenes, tellurophenes, pyrroles, anilines, and polycyclic aromatics. The polymers made from these monomers are referred to herein as polythiophenes, poly(selenophenes), poly(tellurophenes), polypyrroles, polyanilines, and polycyclic aromatic polymers, respectively. The term "polycyclic aromatic" refers to compounds having more than one aromatic ring. The rings may be joined by one or more bonds, or they may be fused together. The term "aromatic ring" is intended to include heteroaromatic rings. A "polycyclic heteroaromatic" compound has at least one heteroaromatic ring. In some embodiments, the polycyclic aromatic polymers are poly(thienothiophenes).

In some embodiments, monomers contemplated for use to form the electrically conductive polymer in the new composition comprise Formula I below:

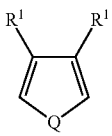
(I)

wherein:
Q is selected from the group consisting of S, Se, and Te;
R¹ is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, ester sulfonate, and urethane; or both R¹ groups together may form an alkylene or alkenylene chain completing a 3, 4, 5, 6, or 7-membered aromatic or alicyclic ring, which ring may optionally include one or more divalent nitrogen, selenium, tellurium, sulfur or oxygen atoms.

As used herein, the term "alkyl" refers to a group derived from an aliphatic hydrocarbon and includes linear, branched and cyclic groups which may be unsubstituted or substituted. The term "heteroalkyl" is intended to mean an alkyl group, wherein one or more of the carbon atoms within the alkyl group has been replaced by another atom, such as nitrogen, oxygen, sulfur, and the like. The term "alkylene" refers to an alkyl group having two points of attachment.

As used herein, the term "alkenyl" refers to a group derived from an aliphatic hydrocarbon having at least one carbon-carbon double bond, and includes linear, branched and cyclic groups which may be unsubstituted or substituted. The term "heteroalkenyl" is intended to mean an alkenyl group, wherein one or more of the carbon atoms within the alkenyl group has been replaced by another atom, such as nitrogen, oxygen, sulfur, and the like. The term "alkenylene" refers to an alkenyl group having two points of attachment.

As used herein, the following terms for substituent groups refer to the formulae given below:
"alcohol" —R³—OH
"amido" —R³—C(O)N(R⁶)R⁶
"amidosulfonate" —R³—C(O)N(R⁶)R⁴—SO₃Z
"benzyl" —CH₂—C₆H₅
"carboxylate" —R³—C(O)O—Z or —R³—O—C(O)—Z
"ether" —R³—(O—R⁵)ₚ—O—R⁵
"ether carboxylate" —R³—O—R⁴—C(O)O—Z or —R³—O—R⁴—O—C(O)—Z
"ether sulfonate" —R³—O—R⁴—SO₃Z
"ester sulfonate" —R³—O—C(O)—R⁴—SO₃Z
"sulfonimide" —R³—SO₂—NH—SO₂—R⁵
"urethane" —R³—O—C(O)—N(R⁶)₂
where all "R" groups are the same or different at each occurrence and:
R³ is a single bond or an alkylene group
R⁴ is an alkylene group
R⁵ is an alkyl group
R⁶ is hydrogen or an alkyl group
p is 0 or an integer from 1 to 20
Z is H, alkali metal, alkaline earth metal, N(R⁵)₄ or R⁵
Any of the above groups may further be unsubstituted or substituted, and any group may have F substituted for one or more hydrogens, including perfluorinated groups. In some embodiments, the alkyl and alkylene groups have from 1-20 carbon atoms.

In some embodiments, in the monomer, both R¹ together form —W—(CY¹Y²)ₘ—W—, where m is 2 or 3, W is O, S, Se, PO, NR⁶, Y¹ is the same or different at each occurrence and is hydrogen or fluorine, and Y² is the same or different at each occurrence and is selected from hydrogen, halogen, alkyl, alcohol, amidosulfonate, benzyl, carboxylate, ether, ether carboxylate, ether sulfonate, ester sulfonate, and urethane, where the Y groups may be partially or fully fluorinated. In some embodiments, all Y are hydrogen. In some embodiments, the polymer is poly(3,4-ethylenedioxythiophene). In some embodiments, at least one Y group is not hydrogen. In some embodiments, at least one Y group is a substituent having F substituted for at least one hydrogen. In some embodiments, at least one Y group is perfluorinated.

In some embodiments, the monomer has Formula I(a):

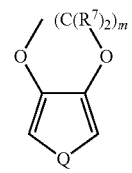
(Ia)

wherein:
Q is selected from the group consisting of S, Se, and Te;
R⁷ is the same or different at each occurrence and is selected from hydrogen, alkyl, heteroalkyl, alkenyl, heteroalkenyl, alcohol, amidosulfonate, benzyl, carboxylate, ether, ether carboxylate, ether sulfonate, ester sulfonate, and urethane, with the proviso that at least one R⁷ is not hydrogen, and
m is 2 or 3.

In some embodiments of Formula I(a), m is two, one R⁷ is an alkyl group of more than 5 carbon atoms, and all other R⁷ are hydrogen. In some embodiments of Formula I(a), at least one R⁷ group is fluorinated. In some embodiments, at least one R⁷ group has at least one fluorine substituent. In some embodiments, the R⁷ group is fully fluorinated.

In some embodiments of Formula I(a), the R⁷ substituents on the fused alicyclic ring on the monomer offer improved solubility of the monomers in water and facilitate polymerization in the presence of the fluorinated acid polymer.

In some embodiments of Formula I(a), m is 2, one R⁷ is sulfonic acid-propylene-ether-methylene and all other R⁷ are hydrogen. In some embodiments, m is 2, one R⁷ is propyl-ether-ethylene and all other R⁷ are hydrogen. In some embodiments, m is 2, one R⁷ is methoxy and all other R⁷ are hydrogen. In some embodiments, one R⁷ is sulfonic acid difluoromethylene ester methylene (—CH₂—O—C(O)—CF₂—SO₃H), and all other R⁷ are hydrogen.

In some embodiments, pyrrole monomers contemplated for use to form the electrically conductive polymer in the new composition comprise Formula II below.

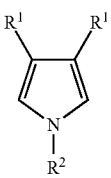
(II)

where in Formula II:

R$^1$ is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, amidosulfonate, ether carboxylate, ether sulfonate, ester sulfonate, and urethane; or both R$^1$ groups together may form an alkylene or alkenylene chain completing a 3, 4, 5, 6, or 7-membered aromatic or alicyclic ring, which ring may optionally include one or more divalent nitrogen, sulfur, selenium, tellurium, or oxygen atoms; and R$^2$ is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, benzyl, carboxylate, ether, ether carboxylate, ether sulfonate, ester sulfonate, and urethane.

In some embodiments, R$^1$ is the same or different at each occurrence and is independently selected from hydrogen, alkyl, alkenyl, alkoxy, cycloalkyl, cycloalkenyl, alcohol, benzyl, carboxylate, ether, amidosulfonate, ether carboxylate, ether sulfonate, ester sulfonate, urethane, epoxy, silane, siloxane, and alkyl substituted with one or more of sulfonic acid, carboxylic acid, acrylic acid, phosphoric acid, phosphonic acid, halogen, nitro, cyano, hydroxyl, epoxy, silane, or siloxane moieties.

In some embodiments, R$^2$ is selected from hydrogen, alkyl, and alkyl substituted with one or more of sulfonic acid, carboxylic acid, acrylic acid, phosphoric acid, phosphonic acid, halogen, cyano, hydroxyl, epoxy, silane, or siloxane moieties.

In some embodiments, the pyrrole monomer is unsubstituted and both R$^1$ and R$^2$ are hydrogen.

In some embodiments, both R$^1$ together form a 6- or 7-membered alicyclic ring, which is further substituted with a group selected from alkyl, heteroalkyl, alcohol, benzyl, carboxylate, ether, ether carboxylate, ether sulfonate, ester sulfonate, and urethane. These groups can improve the solubility of the monomer and the resulting polymer. In some embodiments, both R$^1$ together form a 6- or 7-membered alicyclic ring, which is further substituted with an alkyl group. In some embodiments, both R$^1$ together form a 6- or 7-membered alicyclic ring, which is further substituted with an alkyl group having at least 1 carbon atom.

In some embodiments, both R$^1$ together form —O—(CHY)$_m$—O—, where m is 2 or 3, and Y is the same or different at each occurrence and is selected from hydrogen, alkyl, alcohol, benzyl, carboxylate, amidosulfonate, ether, ether carboxylate, ether sulfonate, ester sulfonate, and urethane. In some embodiments, at least one Y group is not hydrogen. In some embodiments, at least one Y group is a substituent having F substituted for at least one hydrogen. In some embodiments, at least one Y group is perfluorinated.

In some embodiments, aniline monomers contemplated for use to form the electrically conductive polymer in the new composition comprise Formula III below.

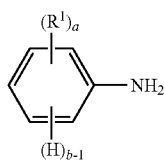

(III)

wherein:

a is 0 or an integer from 1 to 4;

b is an integer from 1 to 5, with the proviso that a+b=5; and

R$^1$ is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, ester sulfonate, and urethane; or both R$^1$ groups together may form an alkylene or alkenylene chain completing a 3, 4, 5, 6, or 7-membered aromatic or alicyclic ring, which ring may optionally include one or more divalent nitrogen, sulfur or oxygen atoms.

When polymerized, the aniline monomeric unit can have Formula IV(a) or Formula IV(b) shown below, or a combination of both formulae.

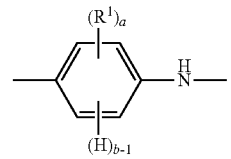

IV(a)

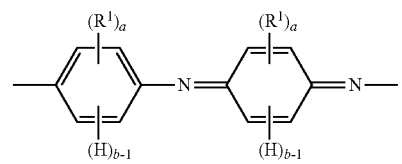

IV(b)

where a, b and R$^1$ are as defined above.

In some embodiments, the aniline monomer is unsubstituted and a=0.

In some embodiments, a is not 0 and at least one R$^1$ is fluorinated. In some embodiments, at least one R$^1$ is perfluorinated.

In some embodiments, fused polycyclic heteroaromatic monomers contemplated for use to form the electrically conductive polymer in the new composition have two or more fused aromatic rings, at least one of which is heteroaromatic. In some embodiments, the fused polycyclic heteroaromatic monomer has Formula V:

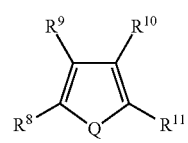

(V)

wherein:

Q is S, Se, Te, or NR$^6$;

R$^6$ is hydrogen or alkyl;

$R^8$, $R^9$, $R^{10}$, and $R^{11}$ are independently selected so as to be the same or different at each occurrence and are selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, nitrile, cyano, hydroxyl, epoxy, silane, siloxane, alcohol, benzyl, carboxylate, ether, ether carboxylate, amidosulfonate, ether sulfonate, ester sulfonate, and urethane; and at least one of $R^8$ and $R^9$, $R^9$ and $R^{10}$, and $R^{10}$ and $R^{11}$ together form an alkenylene chain completing a 5 or 6-membered aromatic ring, which ring may optionally include one or more divalent nitrogen, sulfur, selenium, tellurium, or oxygen atoms.

In some embodiments, the fused polycyclic heteroaromatic monomer has a formula selected from the group consisting of Formula V(a), V(b), V(c), V(d), V(e), V(f), V(g), V(h), V(i), V(j), and V(k):

(Va)

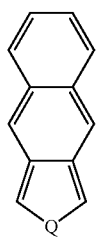

(Vb)

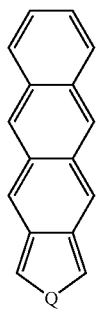

(Vc)

(Vd)

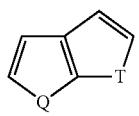

(Ve)

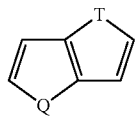

(Vf)

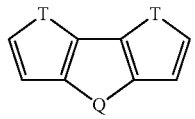

(Vg)

(Vh)

(Vi)

(Vj)

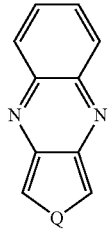

(Vk)

wherein:
Q is S, Se, Te, or NH; and
T is the same or different at each occurrence and is selected from S, $NR^6$, O, $SiR^6{}_2$, Se, Te, and $PR^6$;
Y is N; and
$R^6$ is hydrogen or alkyl.

The fused polycyclic heteroaromatic monomers may be further substituted with groups selected from alkyl, heteroalkyl, alcohol, benzyl, carboxylate, ether, ether carboxylate, ether sulfonate, ester sulfonate, and urethane. In some embodiments, the substituent groups are fluorinated. In some embodiments, the substituent groups are fully fluorinated.

In some embodiments, the fused polycyclic heteroaromatic monomer is a thieno(thiophene). Such compounds have been discussed in, for example, Macromolecules, 34, 5746-5747 (2001); and Macromolecules, 35, 7281-7286 (2002). In some embodiments, the thieno(thiophene) is selected from thieno(2,3-b)thiophene, thieno(3,2-b)thiophene, and thieno(3,4-b)thiophene. In some embodiments, the thieno(thiophene) monomer is further substituted with at least one group selected from alkyl, heteroalkyl, alcohol, benzyl, carboxylate, ether, ether carboxylate, ether sulfonate, ester sulfonate, and urethane. In some embodiments, the substituent groups are fluorinated. In some embodiments, the substituent groups are fully fluorinated.

In some embodiments, polycyclic heteroaromatic monomers contemplated for use to form the polymer in the new composition comprise Formula VI:

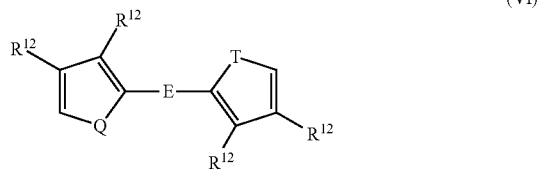

(VI)

wherein:
Q is S, Se, Te, or $NR^6$;
T is selected from S, $NR^6$, O, $SiR^6_2$, Se, Te, and $PR^6$;
E is selected from alkenylene, arylene, and heteroarylene;
$R^6$ is hydrogen or alkyl;
$R^{12}$ is the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, nitrile, cyano, hydroxyl, epoxy, silane, siloxane, alcohol, benzyl, carboxylate, ether, ether carboxylate, amidosulfonate, ether sulfonate, ester sulfonate, and urethane; or both $R^{12}$ groups together may form an alkylene or alkenylene chain completing a 3, 4, 5, 6, or 7-membered aromatic or alicyclic ring, which ring may optionally include one or more divalent nitrogen, sulfur, selenium, tellurium, or oxygen atoms.

In some embodiments, the electrically conductive polymer is a copolymer of a precursor monomer and at least one second monomer. Any type of second monomer can be used, so long as it does not detrimentally affect the desired properties of the copolymer. In some embodiments, the second monomer comprises no more than 50% of the polymer, based on the total number of monomer units. In some embodiments, the second monomer comprises no more than 30%, based on the total number of monomer units. In some embodiments, the second monomer comprises no more than 10%, based on the total number of monomer units.

Exemplary types of second monomers include, but are not limited to, alkenyl, alkynyl, arylene, and heteroarylene. Examples of second monomers include, but are not limited to, fluorene, oxadiazole, thiadiazole, benzothiadiazole, phenylenevinylene, phenyleneethynylene, pyridine, diazines, and triazines, all of which may be further substituted.

In some embodiments, the copolymers are made by first forming an intermediate precursor monomer having the structure A-B-C, where A and C represent precursor monomers, which can be the same or different, and B represents a second monomer. The A-B-C intermediate precursor monomer can be prepared using standard synthetic organic techniques, such as Yamamoto, Stille, Grignard metathesis, Suzuki, and Negishi couplings. The copolymer is then formed by oxidative polymerization of the intermediate precursor monomer alone, or with one or more additional precursor monomers.

In some embodiments, the electrically conductive polymer is selected from the group consisting of a polythiophene, a polypyrrole, a polymeric fused polycyclic heteroaromatic, a copolymer thereof, and combinations thereof.

In some embodiments, the electrically conductive polymer is selected from the group consisting of poly(3,4-ethylenedioxythiophene), unsubstituted polypyrrole, poly(thieno(2,3-b)thiophene), poly(4-aminoindole), poly(7-aminoindole), poly(thieno(3,2-b)thiophene), and poly(thieno(3,4-b)thiophene).

b. Highly-Fluorinated Acid Polymer

The highly-fluorinated acid polymer ("HFAP") can be any polymer which is highly-fluorinated and has acidic groups with acidic protons. The acidic groups supply an ionizable proton. In some embodiments, the acidic proton has a pKa of less than 3. In some embodiments, the acidic proton has a pKa of less than 0. In some embodiments, the acidic proton has a pKa of less than −5. The acidic group can be attached directly to the polymer backbone, or it can be attached to side chains on the polymer backbone. Examples of acidic groups include, but are not limited to, carboxylic acid groups, sulfonic acid groups, sulfonimide groups, phosphoric acid groups, phosphonic acid groups, and combinations thereof. The acidic groups can all be the same, or the polymer may have more than one type of acidic group. In some embodiments, the acidic groups are selected from the group consisting of sulfonic acid groups, sulfonamide groups, and combinations thereof.

In some embodiments, the HFAP is at least 80% fluorinated; in some embodiments, at least 90% fluorinated; in some embodiments, at least 95% fluorinated; in some embodiments, fully-fluorinated.

In some embodiments, the HFAP is water-soluble. In some embodiments, the HFAP is dispersible in water. In some embodiments, the HFAP is organic solvent wettable. The term "organic solvent wettable" refers to a material which, when formed into a film, possesses a contact angle no greater than 60° C. with organic solvents. In some embodiments, wettable materials form films which are wettable by phenylhexane with a contact angle no greater than 55°. The methods for measuring contact angles are well known. In some embodiments, the wettable material can be made from a polymeric acid that, by itself is non-wettable, but with selective additives it can be made wettable.

Examples of suitable polymeric backbones include, but are not limited to, polyolefins, polyacrylates, polymethacrylates, polyimides, polyamides, polyaramids, polyacrylamides, polystyrenes, and copolymers thereof, all of which are highly-fluorinated; in some embodiments, fully-fluorinated.

In one embodiment, the acidic groups are sulfonic acid groups or sulfonimide groups. A sulfonimide group has the formula:

—$SO_2$—NH—$SO_2$—R where R is an alkyl group.

In one embodiment, the acidic groups are on a fluorinated side chain. In one embodiment, the fluorinated side chains are selected from alkyl groups, alkoxy groups, amido groups, ether groups, and combinations thereof, all of which are fully fluorinated.

In one embodiment, the HFAP has a highly-fluorinated olefin backbone, with pendant highly-fluorinated alkyl sulfonate, highly-fluorinated ether sulfonate, highly-fluorinated ester sulfonate, or highly-fluorinated ether sulfonimide groups. In one embodiment, the HFAP is a perfluoroolefin having perfluoro-ether-sulfonic acid side chains. In one embodiment, the polymer is a copolymer of 1,1-difluoroethylene and 2-(1,1-difluoro-2-(trifluoromethyl)allyloxy)-1,1,2,2-tetrafluoroethanesulfonic acid. In one embodiment, the polymer is a copolymer of ethylene and 2-(2-(1,2,2-trifluorovinyloxy)-1,1,2,3,3,3-hexafluoropropoxy)-1,1,2,2-tetrafluoroethanesulfonic acid. These copolymers can be made as the corresponding sulfonyl fluoride polymer and then can be converted to the sulfonic acid form.

In one embodiment, the HFAP is homopolymer or copolymer of a fluorinated and partially sulfonated poly(arylene ether sulfone). The copolymer can be a block copolymer.

In one embodiment, the HFAP is a sulfonimide polymer having Formula IX:

where:
$R_f$ is selected from highly-fluorinated alkylene, highly-fluorinated heteroalkylene, highly-fluorinated arylene, and highly-fluorinated heteroarylene, which may be substituted with one or more ether oxygens; and
n is at least 4.

In one embodiment of Formula IX, $R_f$ is a perfluoroalkyl group. In one embodiment, $R_f$ is a perfluorobutyl group. In one embodiment, $R_f$ contains ether oxygens. In one embodiment n is greater than 10.

In one embodiment, the HFAP comprises a highly-fluorinated polymer backbone and a side chain having Formula X:

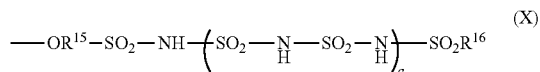

where:
$R^{15}$ is a highly-fluorinated alkylene group or a highly-fluorinated heteroalkylene group;
$R^{16}$ is a highly-fluorinated alkyl or a highly-fluorinated aryl group;
and
a is 0 or an integer from 1 to 4.

In one embodiment, the HFAP has Formula XI:

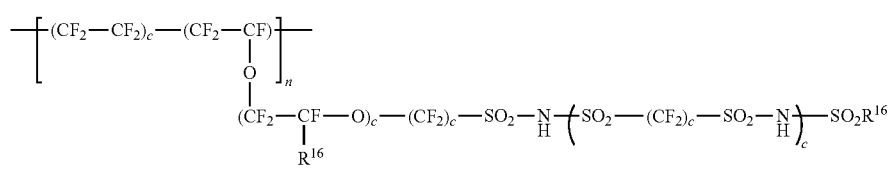

where:
$R^{16}$ is a highly-fluorinated alkyl or a highly-fluorinated aryl group;
c is independently 0 or an integer from 1 to 3; and
n is at least 4.

The synthesis of HFAPs has been described in, for example, A. Feiring et al., J. Fluorine Chemistry 2000, 105, 129-135; A. Feiring et al., Macromolecules 2000, 33, 9262-9271; D. D. Desmarteau, J. Fluorine Chem. 1995, 72, 203-208; A. J. Appleby et al., J. Electrochem. Soc. 1993, 140(1), 109-111; and Desmarteau, U.S. Pat. No. 5,463,005.

In one embodiment, the HFAP also comprises a repeat unit derived from at least one highly-fluorinated ethylenically unsaturated compound. The perfluoroolefin comprises 2 to 20 carbon atoms. Representative perfluoroolefins include, but are not limited to, tetrafluoroethylene, hexafluoropropylene, perfluoro-(2,2-dimethyl-1,3-dioxole), perfluoro-(2-methylene-4-methyl-1,3-dioxolane), $CF_2=CFO(CF_2)_tCF=CF_2$, where t is 1 or 2, and $R_f''OCF=CF_2$ wherein $R_f''$ is a saturated perfluoroalkyl group of from 1 to about ten carbon atoms. In one embodiment, the comonomer is tetrafluoroethylene.

In one embodiment, the HFAP is a colloid-forming polymeric acid. As used herein, the term "colloid-forming" refers to materials which are insoluble in water, and form colloids when dispersed into an aqueous medium. The colloid-forming polymeric acids typically have a molecular weight in the range of about 10,000 to about 4,000,000. In one embodiment, the polymeric acids have a molecular weight of about 100,000 to about 2,000,000. Colloid particle size typically ranges from 2 nanometers (nm) to about 140 nm. In one embodiment, the colloids have a particle size of 2 nm to about 30 nm. Any highly-fluorinated colloid-forming polymeric material having acidic protons can be used. Some of the polymers described hereinabove may be formed in non-acid form, e.g., as salts, esters, or sulfonyl fluorides. They will be converted to the acid form for the preparation of conductive compositions, described below.

In some embodiments, HFAP include a highly-fluorinated carbon backbone and side chains represented by the formula

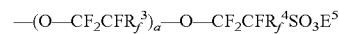

wherein $R_f^3$ and $R_f^4$ are independently selected from F, Cl or a highly-fluorinated alkyl group having 1 to 10 carbon atoms, a=0, 1 or 2, and $E^5$. In some cases $E^5$ can be a cation such as Li, Na, or K, and be converted to the acid form.

In some embodiments, the HFAP can be the polymers disclosed in U.S. Pat. No. 3,282,875 and in U.S. Pat. Nos. 4,358,545 and 4,940,525. In some embodiments, the HFAP comprises a perfluorocarbon backbone and the side chain represented by the formula

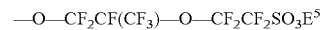

where $E^5$ is as defined above. HFAPs of this type are disclosed in U.S. Pat. No. 3,282,875 and can be made by copolymerization of tetrafluoroethylene (TFE) and the perfluorinated vinyl ether $CF_2=CF-O-CF_2CF(CF_3)-O-CF_2CF_2SO_2F$, perfluoro(3,6-dioxa-4-methyl-7-octenesulfonyl fluoride) (PDMOF), followed by conversion to sulfonate groups by hydrolysis of the sulfonyl fluoride groups and ion exchanged as necessary to convert them to the desired ionic form. An example of a polymer of the type disclosed in U.S. Pat. Nos. 4,358,545 and 4,940,525 has the side chain $-O-CF_2CF_2SO_3E^5$, wherein $E^5$ is as defined above. This polymer can be made by copolymerization of tetrafluoroethylene (TFE) and the perfluorinated vinyl ether $CF_2=CF-O-CF_2CF_2SO_2F$, perfluoro(3-oxa-4-pentenesulfonyl fluoride) (POPF), followed by hydrolysis and further ion exchange as necessary.

One type of HFAP is available commercially as aqueous Nafion® dispersions, from E. I. du Pont de Nemours and Company (Wilmington, Del.).

c. Preparation of the Doped Electrically Conductive Polymer

The doped electrically conductive polymer is formed by oxidative polymerization of the precursor monomer (or multiple monomers) in the presence of the HFAP (or multiple HFAPs) in an aqueous medium. The polymerization has been described in published U.S. patent applications 2004/0102577, 2004/0127637, and 2005/205860.

4. Non-Conductive Oxide Nanoparticles

The oxide nanoparticles are non-conductive and have a particle size no greater than 50 nm. In some embodiments, the particle size is no greater than 20 nm; in some embodiments, no greater than 10 nm; in some embodiments, no greater than 5 nm.

The oxide can be either a single oxide or mixture of two or more oxides. The shape of the nanoparticles can be, fore example, spherical, elongated, chains, needles, core-shell nanoparticles, or combinations thereof.

Examples of non-conductive oxides include, but are not limited to, silicon oxide, titanium oxides, zirconium oxide, molybdenum trioxide, vanadium oxide, aluminum oxide, zinc oxide, samarium oxide, yttrium oxide, cesium oxide, cupric oxide, stannic oxide, antimony oxide, tantalum oxides, and the like. In some embodiments, the non-conductive oxide nanoparticles are selected from the group consisting of silicon dioxide, titanium dioxide, and combinations thereof.

The oxide nanoparticles can be made by the evaporation of the selected oxide, and multi-component oxides, or by vapor-phase hydrolysis of inorganic compounds, for example silicon tetrachloride. It can also be produced by sol-gel chemistry using hydrolyzable metal compounds, particularly alkoxides of various elements, to react with either by hydrolysis and polycondensation to form multi-component and multi-dimensional network oxides.

4. High-Boiling Organic Liquid

The term "high-boiling organic liquid" refers to an organic compound which is a liquid at room temperature and has a boiling point of greater than 160° C. In some embodiments, the boiling point is greater than 170° C.; in some embodiments, greater than 180° C. The high-boiling organic liquid is soluble in, miscible with, or dispersible in water. Examples of high-boiling organic liquids include, but are not limited to ethylene glycol, propylene glycol, dimethylsulfoxide, dimethylacetamide, low molecular weight poly(ethylene glycol), N-methylpyrrolidone, and mixtures thereof. Mixtures of two or more such liquids may be used.

The high-boiling organic liquid is generally present in the composition in the amount of from 40 to 70 wt. %, based on the total weight of the composition; in some embodiments, from 50 to 60 wt. %.

5. Lower-Boiling Organic Liquid

The term "lower-boiling organic liquid" refers to an organic compound which is a liquid at room temperature and has a boiling point of less than 150° C. In some embodiments, the boiling point is less than 130° C.; in some embodiments, less than 110° C. In some embodiments, the boiling point is greater than 70° C. The lower-boiling organic liquid is soluble in, miscible with, or dispersible in water. Examples of lower-boiling organic liquids include, but are not limited to isopropanol, n-propanol, 1-methoxy-2-propanol, propylene glycol propyl ether, propylene glycol mono-methyl ether acetate, and mixtures thereof. Mixtures of two or more such liquids may be used.

The lower-boiling organic liquid is generally present in the composition in the amount of from 5 to 20 wt. %, based on the total weight of the composition; in some embodiments, from 10 to 15 wt. %.

6. Preparation of the Semi-Aqueous Electrically Conductive Polymer Compositions In the following discussion, the doped conductive polymer, non-conductive oxide nanoparticles, high-boiling organic liquid, and lower-boiling organic liquid will be referred to in the singular. However, it is understood that more than one of any or all of these may be used.

The new electrically conductive polymer composition is prepared by first forming the doped conductive polymer and then adding the oxide nanoparticles and the organic liquids, in any order.

The oxide nanoparticles can be added to the doped conductive polymer dispersion directly as a solid. In some embodiments, the oxide nanoparticles are dispersed in an aqueous solution, and this dispersion is mixed with the doped conductive polymer dispersion. The weight ratio of oxide nanoparticles to doped electrically conductive polymer is greater than 1:4 and less than 7:3. In some embodiments, the weight ratio is in the range of 1:3 to 2:1.

The high-boiling organic liquid can be premixed and added together to the doped conductive polymer dispersion, either before or after the addition of the oxide nanoparticles. Alternatively, the organic liquids can be added separately. In some embodiments, the high-boiling organic liquid is added before or simultaneously with the lower-boiling organic liquid. In some embodiments, the lower-boiling organic liquid is added before or simultaneously with the high-boiling organic liquid. One of ordinary skill in the art would appreciate that the compatibility between the solvent and compositions may dictate the order of addition.

The amount of total solvent in the composition is no greater than 80 wt. %, based on the total weight of the composition.

In some embodiments, the pH is increased either prior to the addition of the inorganic particles or after. The dispersions of doped conductive polymer and inorganic nanoparticles remain stable from the as-formed pH of about 2, to neutral pH. The pH can be adjusted by treatment with cation exchange resins prior to nanoparticle addition. In some embodiments, the pH is adjusted by the addition of aqueous base solution. Cations for the base can be, but are not limited to, alkali metal, alkaline earth metal, ammonium, and alkylammonium. In some embodiments, alkali metal is preferred over alkaline earth metal cations.

Films made from the new semi-aqueous conductive composition described herein, are hereinafter referred to as "the new films described herein". The films can be made using any liquid deposition technique, including continuous and discontinuous techniques. Continuous deposition techniques, include but are not limited to, spin coating, gravure coating, curtain coating, dip coating, slot-die coating, spray coating, and continuous nozzle coating. Discontinuous deposition techniques include, but are not limited to, ink jet printing, gravure printing, and screen printing.

In some embodiments, the new films are made by slot-die coating. Slot-die coating is one of the basic methods of applying a liquid material to a substrate. A coating liquid is forced out from a reservoir through a slot by pressure, and transferred to a moving substrate. In practice, the slot is generally much smaller in section than the reservoir, and is oriented perpendicular to the direction of substrate movement. Slot Die coating has many variations, including design of the die itself, orientation of the die to the substrate, distance from the die to the substrate, and the method of generating the pressure which forces liquid out of the die. Slot-die coating is generally recognized to be coating with a die "against" a substrate and actually separated from the substrate by a cushion of liquid being coated.

In the past, aqueous dispersions of conductive polymers doped with highly-fluorinated acid polymers could not be successfully slot-die coated. The resulting films were frequently discontinuous or irregular. In addition, the films could not be overcoated by slot-die coating with an organic solvent or polymer solution, because of the low surface energy of the conductive polymer film. Surprisingly and unexpectedly, it has been found that the new compositions described herein can be coated with slot-die coaters to form smooth, continuous films. High quality films can be formed even over substrates having substantial surface non-uniformities. Furthermore, the new films described herein can be overcoated with active materials in many conventional organic solvents having high surface tension. This is particularly surprising in view of the fact that the contact angle of solvents such as hexanes or xylenes with the HIL surface remains very high.

7. Hole-Injection Layers

In another embodiment of the invention, there are provided hole-injection layers deposited from aqueous dispersions comprising the new conductive polymer composition. The term "hole-injection layer" or "hole-injection material" is intended to mean electrically conductive or semiconductive materials and may have one or more functions in an organic electronic device, including but not limited to, planarization of the underlying layer, charge transport and/or charge injection properties, scavenging of impurities such as oxygen or metal ions, and other aspects to facilitate or to improve the performance of the organic electronic device. The term "layer" is used interchangeably with the term "film" and refers to a coating covering a desired area. The term is not limited by size. The area can be as large as an entire device or as small as a specific functional area such as the actual visual display, or as small as a single sub-pixel. Layers and films can be formed by any conventional deposition technique, including vapor deposition, liquid deposition (continuous and discontinuous techniques), and thermal transfer. Continuous deposition techniques, include but are not limited to, spin coating, gravure coating, curtain coating, dip coating, slot-die coating, spray coating, and continuous nozzle coating. Discontinuous deposition techniques include, but are not limited to, ink jet printing, gravure printing, and screen printing.

The dried films of the new conductive polymer composition are generally not redispersible in water. Thus the hole-injection layer can be applied as multiple thin layers. In addition, the hole-injection layer can be overcoated with a layer of different water-soluble or water-dispersible material without being damaged.

Hole-injection layers made from the new conductive polymer can be overcoated with hole transport materials to form discrete hole-injection/hole-transport bilayers (HIL/HTL). In some embodiments, both layers are formed by slot-die coating. Such discrete HIL/HTL bilayers are useful in organic electronic devices, such as light-emitting diodes, photovoltaic cells, and printed organic transistors.

7. Electronic Devices

In another embodiment of the invention, there are provided electronic devices comprising at least one electroactive layer positioned between two electrical contact layers, wherein the device further includes the new hole-injection layer. The term "electroactive" when referring to a layer or material is intended to mean a layer or material that exhibits electronic or electro-radiative properties. An electroactive layer material may emit radiation or exhibit a change in concentration of electron-hole pairs when receiving radiation.

As shown in FIG. 1, one embodiment of a device, 100, has an anode layer 110, a hole-injection layer 120, a hole transport layer 130, a photoactive layer 140, an optional electron injection/transport layer 150, and a cathode layer 160. The discrete bilayer described herein functions as layers 120 and 130.

The device may include a support or substrate (not shown) that can be adjacent to the anode layer 110 or the cathode layer 160. Most frequently, the support is adjacent to the anode layer 110. The support can be flexible or rigid, organic or inorganic. Examples of support materials include, but are not limited to, glass, ceramic, metal, and plastic films.

The anode layer 110 is an electrode that is more efficient for injecting holes compared to the cathode layer 160. The anode can include materials containing a metal, mixed metal, alloy, metal oxide or mixed oxide. Suitable materials include the mixed oxides of the Group 2 elements (i.e., Be, Mg, Ca, Sr, Ba, Ra), the Group 11 elements, the elements in Groups 4, 5, and 6, and the Group 8-10 transition elements. If the anode layer 110 is to be light transmitting, mixed oxides of Groups 12, 13 and 14 elements, such as indium-tin-oxide, may be used. As used herein, the phrase "mixed oxide" refers to oxides having two or more different cations selected from the Group 2 elements or the Groups 12, 13, or 14 elements. Some non-limiting, specific examples of materials for anode layer 110 include, but are not limited to, indium-tin-oxide ("ITO"), indium-zinc-oxide, aluminum-tin-oxide, gold, silver, copper, and nickel. The anode may also comprise an organic material, especially a conducting polymer such as polyaniline, including exemplary materials as described in "Flexible light-emitting diodes made from soluble conducting polymer," Nature vol. 357, pp 477 479 (11 Jun. 1992). At least one of the anode and cathode should be at least partially transparent to allow the generated light to be observed.

The anode layer 110 may be formed by a chemical or physical vapor deposition process or spin-cast process. Chemical vapor deposition may be performed as a plasma-enhanced chemical vapor deposition ("PECVD") or metal organic chemical vapor deposition ("MOCVD"). Physical vapor deposition can include all forms of sputtering, including ion beam sputtering, as well as e-beam evaporation and resistance evaporation. Specific forms of physical vapor deposition include rf magnetron sputtering and inductively-coupled plasma physical vapor deposition ("IMP-PVD"). These deposition techniques are well known within the semiconductor fabrication arts.

In one embodiment, the anode layer 110 is patterned during a lithographic operation. The pattern may vary as desired. The layers can be formed in a pattern by, for example, positioning a patterned mask or resist on the first flexible composite barrier structure prior to applying the first electrical contact layer material. Alternatively, the layers can be applied as an overall layer (also called blanket deposit) and subsequently patterned using, for example, a patterned resist layer and wet chemical or dry etching techniques. Other processes for patterning that are well known in the art can also be used.

The hole-injection layer 120 is made from the new semi-aqueous conductive polymer composition described herein. Hole-injection layers made from conductive polymers doped with HFAPs, generally are not wettable by organic solvents.

The hole-injection layers described herein can be more wettable and thus are more easily coated with the next layer from a non-polar organic solvent. The hole-injection layer can be deposited onto substrates using a variety of techniques well-known to those skilled in the art. In some embodiments, the hole-injection layer is formed by slot-die coating of the new semi-aqueous conductive polymer composition.

The hole transport layer 130 is present between the hole-injection layer 120 and the electroactive layer 140. This layer may comprise hole transport materials. Examples of hole transport materials for the hole transport layer have been summarized for example, in Kirk-Othmer Encyclopedia of Chemical Technology, Fourth Edition, Vol. 18, p. 837-860, 1996, by Y. Wang. Both hole transporting small molecules and polymers can be used. Commonly used hole transporting molecules include, but are not limited to: 4,4',4"-tris(N,N-diphenyl-amino)-triphenylamine (TDATA); 4,4',4"-tris(N-3-methylphenyl-N-phenyl-amino)-triphenylamine (MTDATA); N,N'-diphenyl-N,N'-bis(3-methylphenyl)-[1,1'-biphenyl]-4,4'-diamine (TPD); 4,4'-bis(carbazol-9-yl) biphenyl (CBP); 1,3-bis(carbazol-9-yl)benzene (mCP); 1,1-bis[(di-4-tolylamino) phenyl]cyclohexane (TAPC); N,N'-bis(4-methylphenyl)-N,N'-bis(4-ethylphenyl)-[1,1'-(3,3'-dimethyl)biphenyl]-4,4'-diamine (ETPD); tetrakis-(3-methylphenyl)-N,N,N',N'-2,5-phenylenediamine (PDA); α-phenyl-4-N,N-diphenylaminostyrene (TPS); p-(diethylamino)benzaldehyde diphenylhydrazone (DEH); triphenylamine (TPA); bis[4-(N,N-diethylamino)-2-methylphenyl](4-methylphenyl)methane (MPMP); 1-phenyl-3-[p-(diethylamino)styryl]-5-[p-(diethylamino)phenyl] pyrazoline (PPR or DEASP); 1,2-trans-bis(9H-carbazol-9-yl)cyclobutane (DCZB); N,N,N',N',-tetrakis(4-methylphenyl)-(1,1'-biphenyl)-4,4'-diamine (TTB); N,N'-bis(naphthalen-1-yl)-N,N'-bis-(phenyl)benzidine (α-NPB); and porphyrinic compounds, such as copper phthalocyanine. Commonly used hole transporting polymers include, but are not limited to, polyvinylcarbazole, (phenylmethyl)polysilane, poly(dioxythiophenes), polyanilines, and polypyrroles. It is also possible to obtain hole transporting polymers by doping hole transporting molecules such as those mentioned above into polymers such as polystyrene and polycarbonate. In some cases, triarylamine polymers are used, especially triarylamine-fluorene copolymers. In some cases, the polymers and copolymers are crosslinkable. Examples of crosslinkable hole transport polymers can be found in, for example, published US patent application 2005-0184287 and published PCT application WO 2005/052027. In some embodiments, the hole transport layer is doped with a p-dopant, such as tetrafluorotetracyanoquinodimethane and perylene-3,4,9,10-tetracarboxylic-3,4,9,10-dianhydride.

In some embodiments, the hole transport layer comprises a hole transport polymer. In some embodiments, the hole transport polymer is a distyrylaryl compound. In some embodiments, the aryl group is has two or more fused aromatic rings. In some embodiments, the aryl group is an acene. The term "acene" as used herein refers to a hydrocarbon parent component that contains two or more ortho-fused benzene rings in a straight linear arrangement.

In some embodiments, the hole transport polymer is an arylamine polymer. In some embodiments, it is a copolymer of fluorene and arylamine monomers.

In some embodiments, the polymer has crosslinkable groups. In some embodiments, crosslinking can be accomplished by a heat treatment and/or exposure to UV or visible radiation. Examples of crosslinkable groups include, but are not limited to vinyl, acrylate, perfluorovinylether, 1-benzo-3, 4-cyclobutane, siloxane, and methyl esters. Crosslinkable polymers can have advantages in the fabrication of solution-process OLEDs. The application of a soluble polymeric material to form a layer which can be converted into an insoluble film subsequent to deposition, can allow for the fabrication of multilayer solution-processed OLED devices free of layer dissolution problems.

Examples of crosslinkable polymers can be found in, for example, published US patent application 2005-0184287 and published PCT application WO 2005/052027.

In some embodiments, the hole transport layer comprises a polymer which is a copolymer of 9,9-dialkylfluorene and triphenylamine. In some embodiments, the polymer is a copolymer of 9,9-dialkylfluorene and 4,4'-bis(diphenylamino)biphenyl. In some embodiments, the polymer is a copolymer of 9,9-dialkylfluorene and TPB. In some embodiments, the polymer is a copolymer of 9,9-dialkylfluorene and NPB. In some embodiments, the copolymer is made from a third comonomer selected from (vinylphenyl)diphenylamine and 9,9-distyrylfluorene or 9,9-di(vinylbenzyl)fluorene.

The hole transport layer 130 can be formed using a variety of techniques well-known to those skilled in the art. In some embodiments, the layer is formed by liquid deposition. In some embodiments, the layer is formed by slot-die coating.

Depending upon the application of the device, the photoactive layer 140 can be a light-emitting layer that is activated by an applied voltage (such as in a light-emitting diode or light-emitting electrochemical cell), a layer of material that responds to radiant energy and generates a signal with or without an applied bias voltage (such as in a photodetector). In one embodiment, the photoactive material is an organic electroluminescent ("EL") material. Any EL material can be used in the devices, including, but not limited to, small molecule organic fluorescent compounds, fluorescent and phosphorescent metal complexes, conjugated polymers, and mixtures thereof. Examples of fluorescent compounds include, but are not limited to, chrysenes, pyrenes, perylenes, rubrenes, coumarins, anthracenes, thiadiazoles, derivatives thereof, and mixtures thereof. Examples of metal complexes include, but are not limited to, metal chelated oxinoid compounds, such as tris(8-hydroxyquinolato)aluminum (Alq3); cyclometalated iridium and platinum electroluminescent compounds, such as complexes of iridium with phenylpyridine, phenylquinoline, or phenylpyrimidine ligands as disclosed in Petrov et al., U.S. Pat. No. 6,670,645 and Published PCT Applications WO 03/063555 and WO 2004/016710, and organometallic complexes described in, for example, Published PCT Applications WO 03/008424, WO 03/091688, and WO 03/040257, and mixtures thereof. In some cases the small molecule fluorescent or organometallic materials are deposited as a dopant with a host material to improve processing and/or electronic properties. Examples of conjugated polymers include, but are not limited to poly(phenylenevinylenes), polyfluorenes, poly(spirobifluorenes), polythiophenes, poly(p-phenylenes), copolymers thereof, and mixtures thereof.

The photoactive layer 140 can be formed using a variety of techniques well-known to those skilled in the art, including liquid deposition, vapor deposition, and thermal transfer. In some embodiments, the layer is formed by liquid deposition.

Optional layer 150 can function both to facilitate electron transport, and also serve as a hole-injection layer or confinement layer to prevent quenching of the exciton at layer interfaces. Preferably, this layer promotes electron mobility and reduces exciton quenching. Examples of electron transport materials which can be used in the optional electron transport layer 150, include metal chelated oxinoid compounds, including metal quinolate derivatives such as tris(8-hydroxyquinolato)aluminum (AlQ), bis(2-methyl-8-quinolinolato) (p-phenylphenolato) aluminum (BAlq), tetrakis-(8-hydroxyquinolato)hafnium (HfQ) and tetrakis-(8-hydroxyquinolato)zirconium (ZrQ); and azole compounds such as 2-(4-biphenylyl)-5-(4-t-butylphenyl)-1,3,4-oxadiazole (PBD), 3-(4-biphenylyl)-4-phenyl-5-(4-t-butylphenyl)-1,2,4-triazole (TAZ), and 1,3,5-tri(phenyl-2-benzimidazole)benzene (TPBI); quinoxaline derivatives such as 2,3-bis(4-fluorophenyl)quinoxaline; phenanthrolines such as 4,7-diphenyl-1,10-phenanthroline (DPA) and 2,9-dimethyl-4,7-diphenyl-1,10-phenanthroline (DDPA); and mixtures thereof. In some embodiments, the electron transport layer further comprises an n-dopant. Examples of n-dopants include, but are not limited to Cs or other alkali metals.

The electron transport layer 150 can be formed using a variety of techniques well-known to those skilled in the art, including liquid deposition, vapor deposition, and thermal transfer. In some embodiments, the layer is formed by vapor deposition.

The cathode 160, is an electrode that is particularly efficient for injecting electrons or negative charge carriers. The cathode can be any metal or nonmetal having a lower work function than the anode. Materials for the cathode can be selected from alkali metals of Group 1 (e.g., Li, Cs), the Group 2 (alkaline earth) metals, the Group 12 metals, including the rare earth elements and lanthanides, and the actinides. Materials such as aluminum, indium, calcium, barium, samarium and magnesium, as well as combinations, can be used. Li-containing organometallic compounds, LiF, $Li_2O$, Cs-containing organometallic compounds, CsF, $Cs_2O$, and $Cs_2CO_3$ can also be deposited between the organic layer and the cathode layer to lower the operating voltage. This layer may be referred to as an electron injection layer.

The cathode layer 160 is usually formed by a chemical or physical vapor deposition process. In some embodiments, the cathode layer will be patterned, as discussed above in reference to the anode layer 110.

Other layers in the device can be made of any materials which are known to be useful in such layers upon consideration of the function to be served by such layers.

In some embodiments, an encapsulation layer (not shown) is deposited over the contact layer 160 to prevent entry of undesirable components, such as water and oxygen, into the device 100. Such components can have a deleterious effect on the organic layer 130. In one embodiment, the encapsulation layer is a barrier layer or film. In one embodiment, the encapsulation layer is a glass lid.

Though not depicted, it is understood that the device 100 may comprise additional layers. Other layers that are known in the art or otherwise may be used. In addition, any of the above-described layers may comprise two or more sub-layers or may form a laminar structure. The choice of materials for each of the component layers is preferably determined by balancing the goals of providing a device with high device efficiency with device operational lifetime considerations, fabrication time and complexity factors and other considerations appreciated by persons skilled in the art. It will be appreciated that determining optimal components, component configurations, and compositional identities would be routine to those of ordinary skill of in the art.

The organic layers can be applied from solutions or dispersions in suitable solvents, using conventional coating or printing techniques, including but not limited to spin-coating, dip-coating, roll-to-roll techniques, slot-die coating, ink-jet printing, continuous nozzle printing, screen-printing, gravure printing and the like. Different liquid deposition methods may be used for different layers.

For liquid deposition methods, a suitable solvent for a particular compound or related class of compounds can be readily determined by one skilled in the art. For some applications, it is desirable that the compounds be dissolved in non-aqueous solvents. Such non-aqueous solvents can be relatively polar, such as $C_1$ to $C_{20}$ alcohols, ethers, and acid esters, or can be relatively non-polar such as $C_1$ to $C_{12}$ alkanes or aromatics such as toluene, xylenes, trifluorotoluene and the like. Other suitable liquids for use in making the liquid composition, either as a solution or dispersion as described herein, comprising the new compounds, includes, but not limited to, chlorinated hydrocarbons (such as methylene chloride, chloroform, chlorobenzene), aromatic hydrocarbons (such as substituted and non-substituted toluenes and xylenes), including trifluorotoluene), polar solvents (such as tetrahydrofuran (THP), N-methylpyrrolidone) esters (such as ethylacetate) alcohols (isopropanol), keytones (cyclopentatone) and mixtures thereof. Suitable solvents for photoactive materials have been described in, for example, published PCT application WO 2007/145979.

In some embodiments, the device is fabricated by liquid deposition of the hole-injection layer, the hole transport layer, and the photoactive layer, and by vapor deposition of the anode, the electron transport layer, an electron injection layer and the cathode. In some embodiments, the hole-injection and hole transport layers are fabricated by slot-die coating, and the photoactive layer is fabricated by a printing method.

In one embodiment, the different layers have the following range of thicknesses: anode 110, 500-5000 Å, in one embodiment 1000-2000 Å; hole-injection layer 120, 50-2000 Å, in one embodiment 200-1000 Å; hole transport layer 130, 50-2000 Å, in one embodiment 200-1000 Å; photoactive layer 140, 10-2000 Å, in one embodiment 100-1000 Å; electron transport layer 150, 50-2000 Å, in one embodiment 100-1000 Å; cathode 160, 200-10000 Å, in one embodiment 300-5000 Å. The desired ratio of layer thicknesses will depend on the exact nature of the materials used.

In operation, a voltage from an appropriate power supply (not depicted) is applied to the device 100. Current therefore passes across the layers of the device 100. Electrons enter the organic polymer layer, releasing photons. In some OLEDs, called active matrix OLED displays, individual deposits of photoactive organic films may be independently excited by the passage of current, leading to individual pixels of light emission. In some OLEDs, called passive matrix OLED displays, deposits of photoactive organic films may be excited by rows and columns of electrical contact layers.

Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

EXAMPLES

Example 1

This example illustrates the preparation of an aqueous dispersion of polypyrrole (PPy) made in the presence of a copolymer of TFE (tetrafluoroethylene) and PSEPVE (perfluoro-3,6-dioxa-4-methyl-7-octenesulfonic acid), a perfluorinated polymeric acid.

A 25% (w/w) colloidal dispersion of poly(TFE-PSEPVE) was made using a procedure similar to the procedure in U.S. Pat. No. 6,150,426, Example 1, Part 2, except that the temperature was approximately 270° C. The poly(TFE-PSEPVE) had an acid equivalent (EW) of 1000. The EW means the weight in grams of the polymer per mole sulfonic acid groups. The dispersion was diluted to 10.9% (w/w) with water prior to the use for polymerization with pyrrole.

Pyrrole monomer was polymerized in the presence of the poly(TFE-PSEPVE) dispersion as described in published U.S. patent application 2005-0205860. The polymerization ingredients had the following mole ratios: poly(TFE-PSEPVE):Pyrrole=3.4; $Na_2S_2O_8$:pyrrole=1.0; $Fe_2(SO_4)_3$:pyrrole=0.1. The reaction was allowed to proceed for 30 minutes. The aqueous PPy/poly(TFE-PSEPVE) dispersion was then pumped through three columns connected in series. The three columns contain Dowex M-31, Dowex M-43, and Dowex M-31 Na+ respectively. The three Dowex ion-exchange resins are from Dow Chemicals Company, Midland, Mich., USA. The ion-resin treated dispersion was subsequently microfluidized with one pass at 5,000 psi using a Microfluidizer Processor M-110Y (Microfluidics, Massachusetts, USA). The microfluidized dispersion was then filtered and degassed. pH of the dispersion was measured to be 3.5 using a standard pH meter and solids was determined to be 7% w/w by a gravimetric method. The dispersion solids are the doped electrically conducting polymer, PPy/poly(TFE-PSEPVE). Films spin-coated from the dispersion and then baked at 275° C. in inert atmosphere for 30 minutes have a conductivity of $1.0 \times 10^{-7}$ S/cm at room temperature.

Example 2

This example illustrates a slot-die coating formulation for formation of a hole-injection layer (HIL).

The aqueous electrically conducting polymer dispersion containing 7% w/w PPy/p-(TFE-PSEPVE) was used to form HIL slot-die coating compositions with silica nanoparticles, propylene glycol (PG), propylene glycol propyl ether (PGPE). The silica nanoparticle dispersion used in this example is IPA(isopropanol)-ST-S from Nissan Chemical Company. The IPA-ST-S contains 26.6% w/w silica nanoparticles in IPA. Particle size of the silica was measured with a Microtrac "nano-ultra" dynamic light scattering. It was found that 50% of the silica had a particle size of 7.1 nm (nanometer) or less. The silica dispersion was then mixed with PPy/poly (TFE-PSEPVE) dispersion, propylene glycol (PG), propylene glycol propyl ether (PGPE) to achieve the desired silica weight percent with respect to total solids. This is summarized in Table 1. The PG and PGPE were kept at 55% w/w and 15% w/w, respectively, based on the total weight of the composition. IPA was present as a result of the IPA-ST-S dispersion and the weight percent IPA increases as the amount of silica increases. For illustration, the 20.0% silica composition was made by mixing 18.3 g 7% w/w PPy/p-(TFE-PSEPVE) dispersion with 11.5 g deionized water first before adding 1.2 g IPA-ST-S, 55 g PG, and 15 g PGPE. The mixture was stirred to make sure that the components were thoroughly mixed.

The five compositions summarized in Table 1 were slot-die coated with a coater set at 75 μm (micrometer) slot width, and 75 um coating gap. The coater traversed above a 6"×6" glass plate at a desired speed, and liquid delivery rate to achieve 40 nm (nanometer) thickness. The 6"×6" plate contains 16 pieces of 1.5 cm×1.5 cm squares. Each square contains sub-pixels in which each pixel is 172 μm×32 μm of ITO indium-tin-oxide (ITO) surface. The HIL-coated plates are used in comparative Examples A and B and Examples 3-5.

TABLE 1

| Slot-die coating formulations | | | | | | |
|---|---|---|---|---|---|---|
| Silica W. % in total solid | PPy/p-(TFE/ PSEPVE) (W %) | Silica (W %) | PG (W %) | PGPE (W %) | Water (W %) | IPA (W %) |
| 0 | 1.6 | 0 | 55.0 | 15.0 | 28.4 | 0 |
| 20.0 | 1.28 | 0.32 | 54.5 | 14.9 | 28.2 | 0.87 |
| 25.0 | 1.20 | 0.40 | 55.0 | 15.0 | 27.3 | 1.1 |
| 33.3 | 1.06 | 0.53 | 55.0 | 15.0 | 26.8 | 1.47 |
| 50.0 | 0.8 | 0.8 | 55.0 | 15.0 | 26.2 | 2.20 |

Comparative Examples A and B

Two HIL-coated plates from Example 2 containing 0% and 20% solid base silica, Comparative Examples A and B, respectively, were slot-die coated with 0.5% w/w HT-1 (a HTL polymer) solution in p-xylene. The slot-coater was also set at 75 μm slot width, and 75 μm coating gap and traversed at various speed and liquid delivery rate to form HTL films on top of the HIL containing plates, but failed to produce a continuous HTL over the HIL, as summarized in Table 2. In Comparative Example A, with no silica, no HT film was formed at all. In Comparative Example B, the film ruptured and was discontinuous, covering only about 50% of the coated area.

Examples 3-5

These examples illustrate the coating of a HTL (hole transporting layer) polymer solution on the HIL containing 25%, 33.3% and 50% solid base silica.

Three HIL-coated plates from Example 2 containing 25%, 33.3$, and 50% solid base silica, Examples 3, 4, and 5, respectively, were slot-die coated with 0.5% w/w HT-1 solution in p-xylene. The slot-coater was also set at 75 μm slot width, and 75 μm coating gap and traversed at various moving speed and liquid delivery rate to form HTL films on top of the HIL containing plates. An HTL film thickness of 25 nm could be easily achieved to produce a discrete HIL/HTL bilayer, as summarized in Table 2. Comparative Examples A and B and Examples 3-5 illustrate the utility of having silica at a minimum concentration for the slot-die coating formulations illustrated in Example 2. In this embodiment, the minimum silica concentration is in the range of ~25% w/w in PPy/p (TFE-PSEPVE)/silica of HIL.

TABLE 2

| Bilayer Coatings | | |
|---|---|---|
| Example | Silica % w/w of total solids | HTL thickness |
| Comparative A | 0 | no layer formed |
| Comparative B | 20 | discontinuous layer |
| Ex. 3 | 25 | 25 nm |

TABLE 2-continued

Bilayer Coatings

| Example | Silica % w/w of total solids | HTL thickness |
|---------|------------------------------|---------------|
| Ex. 4   | 33.3                         | 25 nm         |
| Ex. 5   | 50                           | 25 nm         |

Example 6

This example illustrates the preparation of an HIL/HTL discrete bilayer by slot-die coating using a conductive polymer formulation with silica dispersed in ethylene glycol.

An aqueous electrically conducting polymer dispersion of PPy/p-(TFE-PSEPVE) was prepared according to the procedure described in Example 1. The pH of the dispersion was measured to be 3.5 using a standard pH meter and solid percent was determined to be 7 by a gravimetric method. The solid is electrically conducting polymer of PPy/p-(TFE-PSEPVE). Films spin-coated from the dispersion and then baked at 275° C. in inert atmosphere for 30 minutes have conductivity of $6.5 \times 10^{-3}$ S/cm at room temperature.

The 7% w/w PPy/poly(TFE-PSEPVE) was used to form HIL slot-die coating composition with silica nanoparticles, propylene glycol (PG), propylene glycol propyl ether (PGPE). The silica nanoparticle dispersion used in this example is EG-ST from Nissan Chemical Company. The EG-ST contains 21.2% w/w silica nanoparticles in ethylene glycol. Particle size of the silica was measured with a Microtrac "nano-ultra" dynamic light scattering. It was found that 50% volume of the silica had particle size of about 3.9 nanometers (nm) at cumulative 50% volume distribution as shown in Table 3.

TABLE 3

Summary of Particle Size in nm At Cumulative % Volume Distribution

|  | RUN # | 5% | 16% | 50% | 84% | 95% |
|---|---|---|---|---|---|---|
| EG-ST AS-IS | RUN 1 | 3.310 | 3.500 | 4.000 | 4.650 | 5.150 |
| 21.2% | RUN 2 | 3.300 | 3.470 | 3.920 | 4.460 | 4.860 |
|  | RUN 3 | 3.270 | 3.410 | 3.770 | 4.210 | 4.430 |
|  | AVERAGE | 3.293 | 3.460 | 3.897 | 4.440 | 4.813 |
| DILUTED with EG | RUN 1 | 3.270 | 3.410 | 3.790 | 4.260 | 4.530 |
| to 10.6% | RUN 2 | 3.260 | 3.390 | 3.720 | 4.140 | 4.360 |
|  | RUN 3 | 3.260 | 3.380 | 3.700 | 4.120 | 4.340 |
|  | AVERAGE | 3.263 | 3.393 | 3.737 | 4.173 | 4.410 |
| DILUTED with EG | RUN 1 | 3.270 | 3.410 | 3.780 | 4.270 | 4.560 |
| to 5.3% | RUN 2 | 3.270 | 3.420 | 3.800 | 4.280 | 4.590 |
|  | RUN 3 | 3.270 | 3.410 | 3.780 | 4.260 | 4.550 |
|  | AVERAGE | 3.270 | 3.413 | 3.787 | 4.270 | 4.567 |

17.1 g of the PPy/p-(TFE-PSEPVE) dispersion was first added with 11 g deionized water. To this was added, in order, 1.9 g EG-ST, 55 g propylene PG, and 15 g propylene glycol propyl ether (PGPE). The resulting dispersion contained 1.2% w/w PPy/p-(TFE-PSEPVE), 0.40% w/w silica, 1.5% w/w ethylene glycol, 26.9% w/w water, 15% w/w PGPE, and 55% w/w PG. The silica contents was 25% w/w of total solids. The weight ratio of oxide nanoparticles (silica) to doped conductive polymer [PPy/p-(TFE-PSEPVE)] was 1:3. The dispersion was slot-die coated with a coater set at 75 μm (micrometer) slot width, and 75 μm coating gap. The coater traveled above a 6"×6" glass plate at 14 mm/second, and 8.14/second delivery rate to achieve 40 nm (nanometer) thickness. The 6"×6" plate contains 16 pieces of 1.5 cm×1.5 cm squares. Each square contains subpixels in which each pixel is 172 μm×32 μm ITO indium-tin-oxide (ITO) surface. The slot-die coated HIL plates were first baked at 70° C. for 3 minutes in air before slot-die coated with 0.5% w/w HT-1 in p-xylene. The coater was set at 50 μm (micrometer) slot width, and 60 μm coating gap and traveled above the HIL-coated 6"×6" plate at 20 mm/second, and 14 μL/second delivery rate to achieve 25 nm (nanometer) thickness. HIL/HTL discrete bilayer containing plates were then baked at 275° C. for 30 minutes. FIGS. 1 and 2 show the discrete bilayer squares and subpixels on a 6"×6" plate.

Example 7

This example illustrates the device performance of a solution-processed organic light emitting diode with a blue emitter using the slot-die coated HIL/HTL bilayer.

The HIL(40 nm)/HTL(25 nm) discrete bilayer on the glass plate prepared in Example 6 was spin-coated with a 1.15% w/w emissive layer solution of 13:1 fluorescent host:blue fluorescent dopant in an organic solvent medium. The host is an anthracene derivative. Such materials have been described in, for example, U.S. Pat. No. 7,023,013. The dopant is an arylamine compound. Such materials have been described in, for example, U.S. published patent application US 2006/0033421. The organic solvent medium is a mixture of solvents, as described in published PCT application WO 2007/145979. The emissive layer is subsequently baked at 140° C. for 10 minutes to remove solvent. The layer thickness was about 35 nm. The substrates were then masked and placed in a vacuum chamber. A 15 nm thick layer of a metal quinolate derivative as electron transporting layer was deposited by thermal evaporation, followed by a 0.7 nm layer of cesium fluoride, and 100 nm aluminum cathode layer. The devices were encapsulated using a glass lid, getter pack, and UV curable epoxy. The light emitting diode samples were characterized by measuring their (1) current-voltage (I-V) curves, (2) electroluminescence radiance versus voltage, and (3) electroluminescence spectra versus voltage. All three measurements were performed at the same time and controlled by a computer. The current efficiency (cd/A) of the device at a certain voltage is determined by dividing the electroluminescence radiance of the LED by the current density needed to run the device. The power efficiency (Lm/W) is the current efficiency divided by the operating voltage. The results are given in Table 4, showing that HIL/HTL discrete bilayers fabricated by slot-die coating are applicable for solution-processed OLEDs.

TABLE 4

Device Results

| Current Efficiency (cd/A) | Quantum efficiency (%) | CIEY | Voltage (volt) | T50 (h) @3,300 nits |
|---|---|---|---|---|
| 5.7 | 5.2 | 0.138 | 5.3 | 94 |

All data @1000nits, unless otherwise specified; CIEY is the y color coordinate according to the C.I.E. chromaticity scale (Commission Internationale de L'Eclairage, 1931); T50 (h) is the time in hours to reach 50% of initial luminance @ 24° C.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination.

The use of numerical values in the various ranges specified herein is stated as approximations as though the minimum and maximum values within the stated ranges were both being preceded by the word "about." In this manner slight variations above and below the stated ranges can be used to achieve substantially the same results as values within the ranges. Also, the disclosure of these ranges is intended as a continuous range including every value between the minimum and maximum average values including fractional values that can result when some of components of one value are mixed with those of different value. Moreover, when broader and narrower ranges are disclosed, it is within the contemplation of this invention to match a minimum value from one range with a maximum value from another range and vice versa.

What is claimed is:

1. A composition comprising water having dispersed therein:
   (a) at least one electrically conductive polymer doped with at least one highly fluorinated acid polymer,
   (b) nonconductive oxide nanoparticles,
   (c) at least one high-boiling solvent, and
   (d) at least one lower-boiling solvent, wherein
   the weight ratio of oxide nanoparticles to doped electrically conductive polymer is greater than 1:4 and less than 7:3.

2. The composition of claim 1, wherein the electrically conductive polymer is selected from the group consisting of polythiophenes, poly(selenophenes), poly(tellurophenes), polypyrroles, polyanilines, polycyclic aromatic polymers, copolymers thereof, and combinations thereof.

3. The composition of claim 1, wherein the electrically conductive polymer is selected from the group consisting of unsubstituted polyaniline, poly(3,4-ethylenedioxythiophene), unsubstituted polypyrrole, poly(4-aminoindole), poly(7-aminoindole), poly(thieno(2,3-b)thiophene), poly(thieno-(3,2-b)thiophene), and poly(thieno(3,4-b)thiophene).

4. The composition of claim 1, wherein the highly-fluorinated acid polymer is at least 90% fluorinated and is selected from a sulfonic acid and a sulfonimide.

5. The composition of claim 1, wherein the highly-fluorinated acid polymer is a perfluoroolefin having perfluoroether-sulfonic acid side chains.

6. The composition of claim 1, wherein the highly-fluorinated acid polymer is selected from the group consisting of a copolymer of 1,1-difluoroethylene and 2-(1,1-difluoro-2-(trifluoromethyl)allyloxy)-1,1,2,2-tetrafluoroethanesulfonic acid, a copolymer of ethylene and 2-(2-(1,2,2-trifluorovinyloxy)-1,1,2,3,3,3-hexafluoropropoxy)-1,1,2,2-tetrafluoroethanesulfonic acid, a copolymer of tetrafluoroethylene and perfluoro(3,6-dioxa-4-methyl-7-octenesulfonic acid), and a copolymer of tetrafluoroethylene and perfluoro(3-oxa-4-pentenesulfonic acid).

7. The composition of claim 1, wherein the non-conductive oxide nanoparticles are selected from the group consisting of silicon dioxide, titanium dioxide, and combinations thereof.

8. An electronic device comprising an anode, a hole-injection layer, a photoactive layer, and a cathode; wherein at least one layer is made from the composition of claim 1.

9. A composition comprising water having dispersed therein:
   (a) at least one electrically conductive polymer doped with at least one highly fluorinated acid polymer,
   (b) nonconductive oxide nanoparticles,
   (c) at least one high-boiling solvent, and
   (d) at least one lower-boiling solvent, wherein
   the high-boiling organic liquid is generally present in the composition in the amount of from 40% to 70% w/w, based on the total weight of the composition.

10. The composition of claim 9, wherein the electrically conductive polymer is selected from the group consisting of polythiophenes, poly(selenophenes), poly(tellurophenes), polypyrroles, polyanilines, polycyclic aromatic polymers, copolymers thereof, and combinations thereof.

11. The composition of claim 9, wherein the electrically conductive polymer is selected from the group consisting of unsubstituted polyaniline, poly(3,4-ethylenedioxythiophene), unsubstituted polypyrrole, poly(4-aminoindole), poly(7-aminoindole), poly(thieno(2,3-b)thiophene), poly(thieno-(3,2-b)thiophene), and poly(thieno(3,4-b)thiophene).

12. The composition of claim 9, wherein the highly-fluorinated acid polymer is at least 90% fluorinated and is selected from a sulfonic acid and a sulfonimide.

13. The composition of claim 9, wherein the highly-fluorinated acid polymer is a perfluoroolefin having perfluoroether-sulfonic acid side chains.

14. The composition of claim 9, wherein the highly-fluorinated acid polymer is selected from the group consisting of a copolymer of 1,1-difluoroethylene and 2-(1,1-difluoro-2-(trifluoromethyl)allyloxy)-1,1,2,2-tetrafluoroethanesulfonic acid, and a copolymer of ethylene and 2-(2-(1,2,2-trifluorovinyloxy)-1,1,2,3,3,3-hexafluoropropoxy)-1,1,2,2-tetrafluoroethanesulfonic acid, a copolymer of tetrafluoroethylene and perfluoro(3,6-dioxa-4-methyl-7-octenesulfonic acid), and a copolymer of tetrafluoroethylene and perfluoro(3-oxa-4-pentenesulfonic acid).

15. The composition of claim 9, wherein the non-conductive oxide nanoparticles are selected from the group consisting of silicon dioxide, titanium dioxide, and combinations thereof.

16. An electronic device comprising an anode, a hole-injection layer, a photoactive layer, and a cathode; wherein at least one layer is made from the composition of claim 9.

17. A composition comprising water having dispersed therein:
- (a) at least one electrically conductive polymer doped with at least one highly fluorinated acid polymer,
- (b) nonconductive oxide nanoparticles,
- (c) at least one high-boiling solvent, and
- (d) at least one lower-boiling solvent, wherein the lower-boiling organic liquid is generally present in the composition in the amount of from 5% to 20% w/w, based on the total weight of the composition.

18. The composition of claim 17, wherein the electrically conductive polymer is selected from the group consisting of polythiophenes, poly(selenophenes), poly(tellurophenes), polypyrroles, polyanilines, polycyclic aromatic polymers, copolymers thereof, and combinations thereof.

19. The composition of claim 17, wherein the electrically conductive polymer is selected from the group consisting of unsubstituted polyaniline, poly(3,4-ethylenedioxythiophene), unsubstituted polypyrrole, poly(4-aminoindole), poly(7-aminoindole), poly(thieno(2,3-b)thiophene), poly(thieno-(3,2-b)thiophene), and poly(thieno(3,4-b)thiophene).

20. The composition of claim 17, wherein the highly-fluorinated acid polymer is at least 90% fluorinated and is selected from a sulfonic acid and a sulfonimide.

21. The composition of claim 17, wherein the highly-fluorinated acid polymer is a perfluoroolefin having perfluoroether-sulfonic acid side chains.

22. The composition of claim 17, wherein the highly-fluorinated acid polymer is selected from the group consisting of a copolymer of 1,1-difluoroethylene and 2-(1,1-difluoro-2-(trifluoromethyl)allyloxy)-1,1,2,2-tetrafluoroethanesulfonic acid, and a copolymer of ethylene and 2-(2-(1,2,2-trifluorovinyloxy)-1,1,2,3,3,3-hexafluoropropoxy)-1,1,2,2-tetrafluoroethanesulfonic acid, a copolymer of tetrafluoroethylene and perfluoro(3,6-dioxa-4-methyl-7-octenesulfonic acid), and a copolymer of tetrafluoroethylene and perfluoro(3-oxa-4-pentenesulfonic acid).

23. The composition of claim 17, wherein the non-conductive oxide nanoparticles are selected from the group consisting of silicon dioxide, titanium dioxide, and combinations thereof.

24. An electronic device comprising an anode, a hole-injection layer, a photoactive layer, and a cathode; wherein at least one layer is made from the composition of claim 17.

* * * * *